US011962407B2

United States Patent
Khoshnevisan et al.

(10) Patent No.: US 11,962,407 B2
(45) Date of Patent: Apr. 16, 2024

(54) BLIND DECODING COUNTING FOR REPETITION-BASED PHYSICAL DOWNLINK CONTROL CHANNEL CANDIDATES

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/482,312

(22) Filed: Sep. 22, 2021

(65) Prior Publication Data

US 2022/0094467 A1    Mar. 24, 2022

Related U.S. Application Data

(60) Provisional application No. 63/083,081, filed on Sep. 24, 2020.

(51) Int. Cl.
*H04L 1/00* (2006.01)
*H04L 1/1829* (2023.01)
(Continued)

(52) U.S. Cl.
CPC .......... *H04L 1/0038* (2013.01); *H04L 1/1845* (2013.01); *H04W 24/08* (2013.01); *H04W 72/23* (2023.01)

(58) Field of Classification Search
CPC ... H04L 1/0038; H04L 1/0046; H04L 1/0052; H04L 1/0072; H04L 1/08; H04L 1/1845;
(Continued)

(56) References Cited

U.S. PATENT DOCUMENTS 10,051,618 B2 *  8/2018  Gho ........................ H04L 1/203
10,791,022 B2    9/2020  Blankenship et al.
(Continued)

FOREIGN PATENT DOCUMENTS

EP            3809650 A1 *  4/2021   ....... H04L 27/26025
WO     WO2020064512 A1      4/2020

OTHER PUBLICATIONS

Grossmann et al., "Methods and Apparatuses for Enhancing the Reliability and Performance of the Physical Downlink Control Channel in a Wireless Communications Network", Certified Priority Copy EP 20196152.1 filed Sep. 15, 2020,, for Published document US 20230125672 A1, Total Pages: 63 (Year: 2020).*
(Continued)

*Primary Examiner* — Shah M Rahman
(74) *Attorney, Agent, or Firm* — Holland & Hart LLP/Qualcomm Incorporated

(57) ABSTRACT

Methods, systems, and devices for wireless communications are described. A user equipment (UE) may receive, from a base station, a configuration message which includes one or more parameters pertaining to blind decoding attempts by the UE of repetition-based physical downlink control channel (PDCCH) candidates. The UE may determine, from the configuration message, a blind decoding count mode which indicates a process for counting a number of blind decoding attempts of repetition-based PDCCH candidates. The UE may monitor for one or more repetitions of a downlink control information by attempting to blind decode the one or more repetitions of a PDCCH candidate in accordance with a maximum blind decode count and the blind decoding count mode.

26 Claims, 15 Drawing Sheets

(51) Int. Cl.
H04W 24/08 (2009.01)
H04W 72/23 (2023.01)

(58) Field of Classification Search
CPC .... H04L 5/0053; H04L 1/0025; H04W 24/08; H04W 48/12; H04W 72/23; H04W 8/24; H04W 72/232

See application file for complete search history.

(56) References Cited

U.S. PATENT DOCUMENTS

| | | | |
|---|---|---|---|
| 2014/0092836 A1* | 4/2014 | Park | H04L 1/0038 370/329 |
| 2019/0020506 A1 | 1/2019 | Cheng et al. | |
| 2019/0052487 A1* | 2/2019 | Shelby | H03M 13/13 |
| 2019/0230697 A1* | 7/2019 | Yang | H04W 72/23 |
| 2020/0008235 A1* | 1/2020 | Sarkis | H04L 5/0055 |
| 2020/0145968 A1* | 5/2020 | Yang | H04L 5/001 |
| 2020/0351896 A1 | 11/2020 | Taherzadeh Boroujeni et al. | |
| 2020/0389847 A1* | 12/2020 | Deng | H04W 52/0219 |
| 2021/0037507 A1* | 2/2021 | Choi | H04W 4/70 |
| 2021/0152281 A1* | 5/2021 | Wu | H04L 5/0094 |
| 2021/0160879 A1* | 5/2021 | Lin | H04L 1/0003 |
| 2021/0195559 A1 | 6/2021 | Khoshnevisan et al. | |
| 2021/0360667 A1* | 11/2021 | Moon | H04L 5/0051 |
| 2022/0038207 A1* | 2/2022 | Frenne | H04L 1/0072 |
| 2022/0038210 A1* | 2/2022 | Liu | H04L 5/0094 |
| 2022/0070899 A1* | 3/2022 | Huang | H04L 5/0044 |
| 2023/0076897 A1* | 3/2023 | Svedman | H04W 72/23 |
| 2023/0117189 A1* | 4/2023 | Kim | H04W 72/23 370/329 |
| 2023/0125672 A1* | 4/2023 | Grossmann | H04L 1/0038 370/329 |
| 2023/0132212 A1* | 4/2023 | Gao | H04L 1/1812 370/329 |
| 2023/0147122 A1* | 5/2023 | Canonne-Velasquez | H04L 5/005 370/329 |

OTHER PUBLICATIONS

International Search Report and Written Opinion—PCT/US2021/051745—ISA/EPO—dated Jan. 14, 2022 (208375WO).

Spreadtrum Communications: "Consideration on URLLC Physical Layer Enhancement", 3GPP Draft, 3GPP TSG RAN WG1 Meeting #94bis, R1-1811396—Consideration on URLLC Physical Layer Enhancement, 3rd Generation Partnership Project (3GPP), Mobile Competence Centre, 650, Route Des Lucioles, F-06921 Sophia-Antipolis Cedex, vol. RAN WG1, No. Chenqdu, China, Oct. 8-Oct. 12, 2018, Sep. 29, 2018 (Sep. 29, 2018), XP051518800, 7 Pages, Retrieved from the Internet: URL: http://www.3gpp.org/ftp/tsg%5Fran/WG1%5FRL1/TSGR1%5F94b/Docs/R1%2D1811396%2Ezip [Retrieved on Sep. 29, 2018], Section 2.

3GPP: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project, Mobile Competence Centre, 650, Route Des Lucioles, F-06921, Sophia-Antipolis, Cedex, France, vol. RAN WG1, No. V16.0.0, Dec. 2019, Jan. 14, 2020, XP051860806, pp. 1-146.

* cited by examiner

BLIND DECODING COUNTING FOR REPETITION-BASED PHYSICAL DOWNLINK CONTROL CHANNEL CANDIDATES

CROSS REFERENCE

The present Application for Patent claims the benefit of U.S. Provisional Patent Application No. 63/083,081 by KHOSHNEVISAN et al., entitled "BLIND DECODING COUNTING FOR REPETITION-BASED PHYSICAL DOWNLINK CONTROL CHANNEL CANDIDATES," filed Sep. 24, 2020, assigned to the assignee hereof, and expressly incorporated by reference herein.

FIELD OF TECHNOLOGY

The following relates to wireless communications, including blind decoding counting of repetition-based physical downlink control channel candidates.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support blind decoding counting of repetition-based PDCCH candidates. Generally, aspects of the described techniques support various mechanisms for a base station and/or user equipment (UE) to identify a blind decoding rule to be applied by the UE for blind decoding attempts of repetition-based PDCCH candidates. For example, a base station may configure the UE with a blind decoding count mode that indicates how the UE will count blind decoding attempts of the repetition-based PDCCH. The blind decoding count mode may include the UE counting a soft combining of different repetitions as a single blind decoding attempt, the UE counting each attempted decoding of an individual PDCCH candidate as separate blind decoding events, and the like. Some blind decoding count modes may allow the UE to count attempted decoding of individual PDCCH candidates and/or soft combining(s). In some situations, the UE may report its own blind decoding capabilities (e.g., in a UE capability message), and the configuration message provided by the base station may be based on the UE capability message. For example, the UE may include in a UE capability message the specific blind decoding count mode(s) the UE supports for blind decoding attempt counting. The UE may monitor repetitions of a downlink control information (DCI) detected in the repetition-based PDCCH candidates.

A method of wireless communication at a UE is described. The method may include receiving, from a base station, a configuration message which includes one or more parameters pertaining to blind decoding attempts by the UE of repetition-based PDCCH candidates, determining, from the configuration message, a blind decoding count mode which indicates a process for counting a number of blind decoding attempts of repetition-based PDCCH candidates, and monitoring for one or more repetitions of a DCI by attempting to blind decode the one or more repetitions of a PDCCH candidate in accordance with a maximum blind decode count and the blind decoding count mode.

An apparatus for wireless communication is described. The apparatus may include a processor of a UE, a transceiver coupled with the processor, and memory coupled with the processor, the memory and the processor configured to cause the apparatus to receive, from a base station, a configuration message which includes one or more parameters pertaining to blind decoding attempts by the UE of repetition-based PDCCH candidates, determine, from the configuration message, a blind decoding count mode which indicates a process for counting a number of blind decoding attempts of repetition-based PDCCH candidates, and monitor for one or more repetitions of a DCI by attempting to blind decode the one or more repetitions of a PDCCH candidate in accordance with a maximum blind decode count and the blind decoding count mode.

Another apparatus for wireless communication at a UE is described. The apparatus may include means for receiving, from a base station, a configuration message which includes one or more parameters pertaining to blind decoding attempts by the UE of repetition-based PDCCH candidates, determining, from the configuration message, a blind decoding count mode which indicates a process for counting a number of blind decoding attempts of repetition-based PDCCH candidates, and monitoring for one or more repetitions of a DCI by attempting to blind decode the one or more repetitions of a PDCCH candidate in accordance with a maximum blind decode count and the blind decoding count mode.

A non-transitory computer-readable medium storing code for wireless communication at a UE is described. The code may include instructions executable by a processor to receive, from a base station, a configuration message which includes one or more parameters pertaining to blind decoding attempts by the UE of repetition-based PDCCH candidates, determine, from the configuration message, a blind decoding count mode which indicates a process for counting a number of blind decoding attempts of repetition-based PDCCH candidates, and monitor for one or more repetitions of a DCI by attempting to blind decode the one or more repetitions of a PDCCH candidate in accordance with a maximum blind decode count and the blind decoding count mode.

Some examples of the method, apparatuses, and non-transitory computer-readable medium described herein may further include operations, features, means, or instructions for transmitting a UE capability message indicating information associated with blind decoding operations supported by the UE when performing blind decoding attempts of the repetition-based PDCCH candidates, where the configuration message may be based on the UE capability message.

In some examples of the method, apparatuses, and non-transitory computer-readable medium described herein, the information associated with the blind decoding operations supported by the UE includes at least one of a set of blind decoding count modes that the UE supports, a number of repetitions of the DCI associated with the blind decoding operations, or both.

In some examples of the method, apparatuses, and non-transitory computer-readable medium described herein, the repetition-based PDCCH candidates include a set of PDCCH candidates in a same search space associated with a common control resource set (CORESET) or separate CORESETs.

In some examples of the method, apparatuses, and non-transitory computer-readable medium described herein, wherein the repetition-based PDCCH candidates comprise a first PDCCH candidate in a first search space set and a second PDCCH candidate in a second search space set, the first search space set and the second search space set associated with separate CORESETS or a common CORESET (e.g., the same CORESET).

In some examples of the method, apparatuses, and non-transitory computer-readable medium described herein, receiving the configuration message may include operations, features, means, or instructions for receiving the configuration message in radio resource control (RRC) signaling.

In some examples of the method, apparatuses, and non-transitory computer-readable medium described herein, monitoring for the one or more repetitions of the DCI may include operations, features, means, or instructions for identifying that the blind decoding count mode includes soft combining a first repetition of the DCI with a second repetition of the DCI, and attempting to blind decode the one or more repetitions of the PDCCH (e.g., the DCI(s) carried in PDCCH) by incrementing a blind decode count by one for each soft combining, the blind decode count to not exceed the maximum blind decode count.

In some examples of the method, apparatuses, and non-transitory computer-readable medium described herein, monitoring for the one or more repetitions of the DCI may include operations, features, means, or instructions for identifying that the blind decoding count mode includes attempting to blind decode a first repetition of the DCI and a second repetition of the DCI, and attempting to blind decode the first repetition of the PDCCH (e.g., the first DCI carried in PDDCH) and the second repetition of the PDCCH (e.g., the second DCI carried in PDCCH) by incrementing a blind decode count by one for each attempted blind decode, the blind decode count not to exceed the maximum blind decode count.

In some examples of the method, apparatuses, and non-transitory computer-readable medium described herein, monitoring for the one or more repetitions of the DCI may include operations, features, means, or instructions for identifying that the blind decoding count mode includes attempting to blind decode a first repetition of the DCI and soft combining the first repetition of the DCI with a second repetition of the DCI, and attempting to blind decode the first repetition of the PDCCH (e.g., the DCI carried in PDCCH) and soft combining the first repetition of the PDCCH (e.g., the DCI carried in PDCCH) with the second repetition of the PDCCH (e.g., the DCI carried in PDCCH) by incrementing a blind decode count by one for each attempted blind decode and for each soft combining, the blind decode count not to exceed the maximum blind decode count.

In some examples of the method, apparatuses, and non-transitory computer-readable medium described herein, monitoring for the one or more repetitions of the DCI may include operations, features, means, or instructions for identifying that the blind decoding count mode includes attempting to blind decode a first repetition of the PDCCH (e.g., the DCI carried in PDCCH) and a second repetition of the PDCCH (e.g., the DCI carried in PDCCH) and soft combining the first repetition of the DCI with the second repetition of the DCI, and attempting to blind decode the first repetition of the PDCCH (e.g., the DCI carried in PDCCH) and the second repetition of the PDCCH and soft combining the first repetition of the PDCCH (e.g., the DCI carried in PDCCH) and the second repetition of the PDCCH by incrementing a blind decode count by one for each attempted blind decode and for each soft combining, the blind decode count not to exceed the maximum blind decode count.

Some examples of the method, apparatuses, and non-transitory computer-readable medium described herein may further include operations, features, means, or instructions for transmitting, to a base station, an indication of a number to be counted in the blind decode count for each blind decoding attempt of the one or more repetitions of the DCI, the blind decoding count mode based at least in part on the indication.

A method of wireless communication at a base station is described. The method may include determining, for a UE, a blind decoding count mode which indicates a process for the UE to use for counting a number of blind decoding attempts of repetition-based PDCCH candidates, transmitting, to the UE and based on the blind decoding count mode, a configuration message which includes one or more parameters pertaining to blind decoding attempts by the UE of the repetition-based PDCCH candidates, and transmitting one or more repetitions of a DCI to the UE using the repetition-based PDCCH candidates, where the UE attempts to blind decode the one or more repetitions of a PDCCH candidate in accordance with a maximum blind decode count and the blind decoding count mode.

An apparatus for wireless communication is described. The apparatus may include a processor of a base station, a transceiver coupled with the processor, and memory coupled with the processor, the memory and the processor configured to cause the apparatus to determine, for a UE, a blind decoding count mode which indicates a process for the UE to use for counting a number of blind decoding attempts of repetition-based PDCCH candidates, transmit, to the UE and based on the blind decoding count mode, a configuration message which includes one or more parameters pertaining to blind decoding attempts by the UE of the repetition-based PDCCH candidates, and transmit one or more repetitions of a DCI to the UE using the repetition-based PDCCH candidates, where the UE attempts to blind decode the one or more repetitions of a PDCCH candidate in accordance with a maximum blind decode count and the blind decoding count mode.

Another apparatus for wireless communication at a base station is described. The apparatus may include means for determining, for a UE, a blind decoding count mode which indicates a process for the UE to use for counting a number of blind decoding attempts of repetition-based PDCCH candidates, transmitting, to the UE and based on the blind decoding count mode, a configuration message which includes one or more parameters pertaining to blind decoding attempts by the UE of the repetition-based PDCCH candidates, and transmitting one or more repetitions of a DCI to the UE using the repetition-based PDCCH candidates, where the UE attempts to blind decode the one or more repetitions of a PDCCH candidate in accordance with a maximum blind decode count and the blind decoding count mode.

A non-transitory computer-readable medium storing code for wireless communication at a base station is described. The code may include instructions executable by a processor to determine, for a UE, a blind decoding count mode which indicates a process for the UE to use for counting a number of blind decoding attempts of repetition-based PDCCH candidates, transmit, to the UE and based on the blind decoding count mode, a configuration message which includes one or more parameters pertaining to blind decoding attempts by the UE of the repetition-based PDCCH candidates, and transmit one or more repetitions of a DCI to the UE using the repetition-based PDCCH candidates, where the UE attempts to blind decode the one or more repetitions of a PDCCH candidate in accordance with a maximum blind decode count and the blind decoding count mode.

Some examples of the method, apparatuses, and non-transitory computer-readable medium described herein may further include operations, features, means, or instructions for receiving a UE capability message from the UE indicating information associated with blind decoding operations that the UE supports when performing blind decoding attempts of the repetition-based PDCCH candidates, where the configuration message may be based on the UE capability message.

In some examples of the method, apparatuses, and non-transitory computer-readable medium described herein, the information associated with the blind decoding operations that the UE supports includes at least one of a set of blind decoding count modes that the UE supports, a number of repetitions of the DCI associated with the blind decoding operations, or both.

In some examples of the method, apparatuses, and non-transitory computer-readable medium described herein, the repetition-based PDCCH candidates include a set of PDCCH candidates in a same search space set, the same search space set associated with a common CORESET or with separate CORESETS (e.g., different CORESETs).

In some examples of the method, apparatuses, and non-transitory computer-readable medium described herein, the configuration message may be transmitted in RRC signaling.

DETAILED DESCRIPTION

Figure 1:
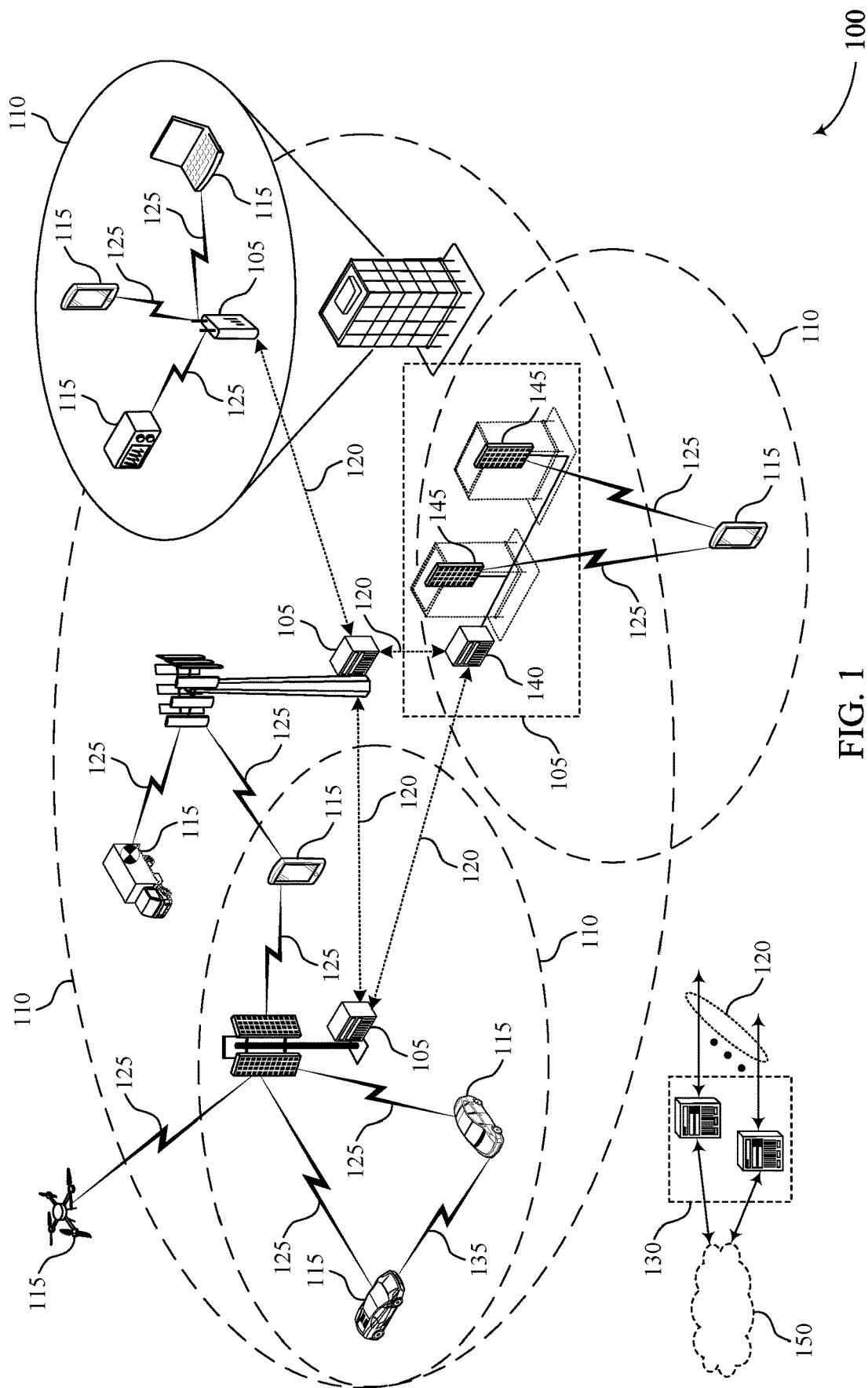
FIG. 1 illustrates an example of a system for wireless communications that supports blind decoding counting for repetition-based physical downlink control channel (PDCCH) candidates in accordance with aspects of the present disclosure.

Some wireless communication systems may support repetition-based physical downlink control channel (PDCCH) candidates where the same downlink control information (DCI) may be sent from a base station to a user equipment (UE) in multiple PDCCH candidates. Repetition-based PDCCH candidates carrying repetitions of the DCI may be scheduled for the UE, but a UE may not actually monitor for each PDCCH candidate. For example, a successful decoding of a DCI carried in an early PDCCH candidate might result in the UE not monitoring for later PDCCH candidates carrying the same DCI. Nevertheless, the UE may attempt to blind decode some or all of the repetition-based PDCCH candidates. However, a UE may be configured with a maximum blind decode limit. If a UE attempts to decode a PDCCH candidate and is not successful, the UE increments a blind decode count and then attempts to decode the next PDCCH candidate. In repetition-based PDCCH, this may lead to the UE reaching its blind decode limit faster than for non-repetition-based PDCCH (e.g., if the UE counted each blind decoding attempt). This may lead to the UE prematurely abandoning the blind decoding attempts and, therefore, not being able to recover the DCI. As the DCI may be used to schedule downlink and/or uplink communications with the UE, the UE would therefore miss the scheduled communications. That may result in a substantial waste of over-the-air resources, processing, battery usage, and the like.

Aspects of the disclosure are initially described in the context of wireless communication systems. Generally, the described techniques provide various mechanisms that support wireless communications in a wireless network. Broadly, aspects of the described techniques support various mechanisms for a base station and/or UE to identify a blind decoding rule to be applied by the UE for blind decoding attempts of repetition-based PDCCH candidates. For example, a base station may configure the UE with a blind decoding count mode that indicates how the UE will count blind decoding attempts for the repetition-based PDCCH. The blind decoding count mode may include the UE counting a soft combining of different repetitions as a single blind decoding attempt. Alternatively, the blind decoding count mode may allow the UE to count each attempted decoding of an individual PDCCH candidate as separate blind decoding events. Some blind decoding count mode may allow the UE to count attempted decoding of individual PDCCH candidates and/or soft combining(s). In some situations, the UE may report its own blind decoding capabilities (e.g., in a UE capability message), and the configuration message provided by the base station may be based on the UE capability message. For example, the UE may include in a UE capability message the specific blind decoding count mode(s) the UE supports for blind decoding attempt counting. The UE may monitor repetitions of a DCI detected in the repetition-based PDCCH candidates.

Aspects of the disclosure are further illustrated by and described with reference to apparatus diagrams, system diagrams, and flowcharts that relate to blind decoding counting for repetition-based PDCCH candidates.

FIG. 1 illustrates an example of a wireless communication system 100 that supports blind decoding counting for repetition-based PDCCH candidates in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, a configuration message which includes one or more parameters pertaining to blind decoding attempts by the UE 115 of repetition-based PDCCH candidates. The UE may determine, from the configuration message, a blind decoding count mode which indicates a process for counting a number of blind decoding attempts of repetition-based PDCCH candidates. The UE 115 may monitor for one or more repetitions of a DCI by attempting to blind decode the one or more repetitions of a PDCCH candidate in accordance with a maximum blind decode count and the blind decoding count mode.

A base station 105 may determine, for a UE 115, a blind decoding count mode which indicates a process for the UE 115 to use for counting a number of blind decoding attempts of repetition-based PDCCH candidates. The base station 105 may transmit, to the UE 115 and based at least in part on the blind decoding count mode, a configuration message which includes one or more parameters pertaining to blind decoding attempts by the UE 115 of the repetition-based PDCCH candidates. The base station 105 may transmit one or more repetitions of a DCI to the UE 115 using the repetition-based PDCCH candidates, wherein the UE 115 attempts to blind decode the one or more repetitions of a PDCCH candidate in accordance with a maximum blind decode count and the blind decoding count mode.

Figure 2:
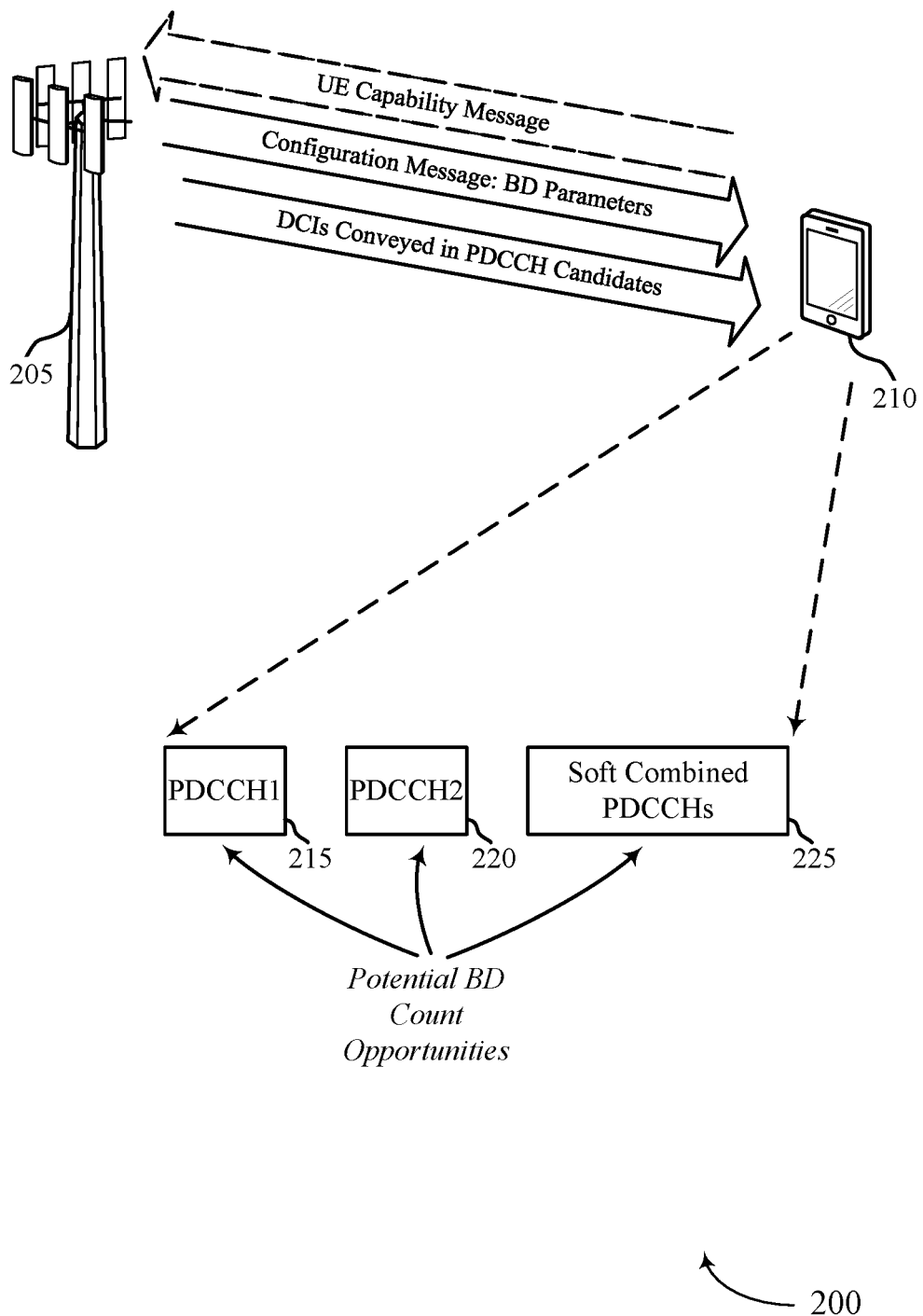
FIG. 2 illustrates an example of a wireless communication system that supports blind decoding counting for repetition-based PDCCH candidates in accordance with aspects of the present disclosure.

FIG. 2 illustrates an example of a wireless communication system 200 that supports blind decoding counting for repetition-based PDCCH candidates in accordance with aspects of the present disclosure. In some examples, wireless communication system 200 may implement aspects of wireless communication system 100. Wireless communication system 200 may include base station 205 and/or UE 210, which may be examples of the corresponding devices described herein. In some aspects, base station 205 may be a serving base station or a cell of UE 210 and may support repetition-based PDCCH candidates configured for UE 210.

In some aspects, UE 210 may be configured with one or more CORESETs in a BWP of a serving cell. For example, UE 210 may be configured with three, five, or some other number of CORESETs in a BWP configured by base station 205. Generally, each CORESET may be associated with one active transmission configuration indicator (TCI) state. For example, as part of the configuration of the CORESET for UE 210 by base station 205, the number of resource blocks (RBs) of the CORESET in the frequency domain and the number of symbols of the CORESET in the time domain (e.g., one, two, or three OFDM symbols) may be RRC configured for UE 210.

In some aspects, each search space (SS) set may be associated with one CORESET. There may be up to ten SS sets in a BWP of the component carrier. As part of the SS set configuration, RRC signaling may be used to configure the associated CORESET, the periodicity and offset of the monitored slots and the symbols to be monitored within the slot in the time domain, the DCI formats to be monitored, the number of PDCCH candidates for a given aggregation level (AL), and the like. The PDCCH candidates may be defined as part of a SS set configuration. For example, the PDCCH candidate with a given AL in a given PDCCH candidate index may be defined in a given SS set. A DCI may be conveyed in one PDCCH candidate. For example, UE 210 may monitor PDCCH candidates in SS sets, and determine that PDCCH candidate(s) has passed a CRC check (e.g., UE 210 may attempt to blindly decode each PDCCH candidate, with a blind decoding attempt where the PDCCH candidate passes the CRC check corresponding to a successfully decoded DCI).

However, in some wireless communication systems there may be a limit (e.g., a maximum number) of monitored PDCCH candidates that UE 210 can attempt to blindly decode (e.g., a blind decode limit, which may be also referred to as a maximum blind decode count). The blind decode limit (or BD limit) may be based on a given slot or other span in the time domain. For example, the maximum number of monitored PDCCH candidates per slot in a downlink BWP with different subcarrier spacing (SCS) configurations for a single serving cell may correspond to 20-44, depending on the SCS configuration. In another example, the maximum number of monitored PDCCH candidates per span (e.g., such as a set of one or more symbols in the time domain) in a downlink BWP with different SCS configurations for a single serving cell may correspond to 12-44, depending on the SCS configuration and other factors.

Some wireless communication systems may enable a PDCCH transmission with two active TCI states. Variations of this approach may include one CORESET with two active TCI states, one SS set associated with two different CORESETS, two SS sets associated with corresponding CORESETs, and the like. In the situation where one CORESET is associated with two active TCI states, base station 205 may configure one PDCCH candidate (in a given SS set) to be associated with both TCI states of the CORESET. In another approach where one CORESET may be associated with two active TCI states, base station 205 may configure two sets of PDCCH candidates (in a given SS set) to be associated with the two active TCI states of the CORESET, respectively. In yet another approach where one CORESET may be associated with two active TCI states, base station 205 may configure two sets of PDCCH candidates to be associated with two corresponding SS sets, where both SS sets are associated with the CORESET and each SS set is associated with only one TCI state of the CORESET. Generally, a set of PDCCH candidates may include a single or multiple PDCCH candidates, and the PDCCH candidate in a set corresponds to a repetition or chance in which the DCI may be indicated to UE 210.

The set of PDCCH candidates may provide repetition-based PDCCH candidates where each PDCCH candidate is linked to the other PDCCH candidates in the set. For example, two or more PDCCH candidates may be explicitly linked together (e.g., base station 205 may configure the linkage to UE 210 before UE 210 attempts to perform blind decoding of the PDCCH candidates). In another example, two or more PDCCH candidates may not be explicitly linked together, the UE 210 may identify or otherwise determine the linkage after decoding. However, some wireless communication systems do not provide a mechanism or other indication of how the one or more PDCCH candidates are counted for when the monitoring is applied to the blind decoding limit configured for UE 210.

Accordingly, wireless communication system 200 may support PDCCH repetition, where each PDCCH repetition corresponds to a PDCCH candidate, and two or more PDCCH candidates may be linked together as possible repetitions of the same DCI. Aspects of the described techniques provide different approaches for how to count the number of PDCCH candidates "for monitoring" as applied towards the blind decoding limit of the UE. Generally, aspects of the described techniques provide various mechanisms where base station 205 may configure UE 210 with a blind decoding count mode identifying a process for counting a number of blind decoding attempts in repetition-based PDCCH candidates.

In some aspects, this may optionally include UE 210 transmitting or otherwise providing (and base station 205 receiving or otherwise obtaining) a UE capability message. In some aspects, the UE capability message may carry or otherwise convey an indication of information associated with blind decoding operations supported by UE 210 when performing blind decoding attempts in repetition-based PDCCH candidates. For example, the UE capability message may be transmitted during initial connection and/or after initial connection. The UE capability message may be updated (e.g., a second UE capability message may be sent) based on various changes or other conditions observed by UE 210.

Accordingly, UE 210 may indicate a UE capability (e.g., through UE capability signaling) including a number that may be counted when monitoring towards the blind decoding limit corresponding to the two or more PDCCH repetitions (e.g., the number of blind decoding attempts). That is, the number that may be counted may be based on the blind decoding count mode(s) supported by UE 210. For each blind decoding count mode, the number that may be counted may correspond to when/how UE 210 considers a blind decoding attempt to be counted (e.g., whether attempting to blind decode a single PDCCH repetition or soft combined PDCCH repetitions counts as one blind decoding attempt) toward the blind decoding limit. UE 210 may configure the UE capability message to carry or otherwise convey an indication of more than one number (e.g., when UE 210 is capable of supporting more than one decoding count modes, where each number of the more than one number may correspond to a different blind decoding count mode supported by UE 210). In some aspects, the number may correspond to or otherwise be a function of the number of repetitions (e.g., for more than two repetitions) to be counted. Instead of a number, in some examples UE 210 may configure the UE capability message to directly indicate the blind decoding count mode(s) supported by UE 210.

In some examples, the UE capability message is optional and therefore may not be transmitted. In this situation, base station 205 may simply select and indicate the parameter(s) pertaining to the blind decoding attempts by UE 210 of repetition-based PDCCH candidates.

In response to the optional UE capability message, base station 205 may identify or otherwise select parameters pertaining to blind decoding attempts by UE 210 in repetition-based PDCCH candidates. For example, base station 205 may select the blind decoding count mode to be applied by UE 210 for counting the number of blind decoding attempts for the repetition-based PDCCH candidates. That is, base station 205 may determine that the number that may be counted based on the blind decoding count mode(s) supported by UE 210. For each blind decoding count mode, the number that may be counted may correspond to when/how UE 210 considers a blind decoding attempt to be counted (e.g., whether attempting to blind decode a single PDCCH repetition or soft combined PDCCH repetitions counts as one blind decoding attempt) toward the blind decoding limit. The number that may be counted may be determined based on UE capability signaling and/or otherwise determined/supported by base station 205 and UE 210. Accordingly, base station 205 may transmit or otherwise convey (and UE 210 may receive or otherwise obtain) a configuration message which carries or otherwise conveys the parameter(s) pertaining to blind decoding attempts by UE 210 of a repetition-based PDCCH candidates. The configuration message may be transmitted in RRC signaling, a MAC CE, a DCI, and the like.

Accordingly, the network may configure (e.g., via RRC signaling) UE 210 with a number (e.g., the blind decoding count mode) that UE 210 counts for monitoring toward the blind decoding limit corresponding to the two PDCCH repetitions (e.g., a number of blind decoding attempts). Again, the number that may be counted may be based on the blind decoding count mode(s) supported by UE 210. For each blind decoding count mode, the number that may be counted may correspond to when/how UE 210 considers a blind decoding attempt to be counted (e.g., whether attempting to blind decode a single PDCCH repetition or soft combined PDCCH repetitions counts as one blind decoding attempt) toward the blind decoding limit. The network (e.g., via the configuration message) may configure one of the blind decoding count modes discussed below and/or may include other information to convey or otherwise indicate the parameter(s) that UE 210 is to use when performing blind decoding operations.

As discussed above, in some aspects this may be based on the repetition-based PDCCH candidates being linked or otherwise associated with each other. That is, the first PDCCH candidate 215 may be linked or otherwise associated with the second PDCCH candidate 220 in the repetition-based PDCCH candidates. The two or more PDCCH candidates may be linked together based on being associated or otherwise configured in the same SS set that is associated with a CORESET, in different SS sets associated with a CORESET, in the same SS set associated with two CORESETs, in different SS sets that are associated with a corresponding CORESETs (e.g., different CORESETS), and the like. The two or more PDCCH candidates may be linked together based on the PDCCH candidates carrying DCI repetitions.

Based on the configuration message, UE 210 may identify, select, or otherwise determine the blind decoding count mode to be applied by UE 210 for counting the number of blind decoding attempts for the repetition-based PDCCH candidates. Various blind decoding count modes may be implemented.

One example of a blind decoding count mode may include soft combining a first repetition of a DCI (e.g., carried in a first PDCCH candidate 215) with a second repetition of the DCI (e.g., carried in a second PDCCH candidate 220). UE 210 may attempt to blindly decode the one or more repetitions of the PDCCH by incrementing a blind decoding count by one for each soft combining. That is, UE 210 may soft combine the first repetition with the second repetition and attempt to blind decode the soft combined repetitions (e.g., the soft combined PDCCHs 225). In this blind decoding count mode example, this may count as one blind decoding attempt and the blind decoding counter may be incremented by one. Accordingly, the blind decoding count mode may include a first repetition and a second repetition being soft combined and only one decoding attempt being counted based on the combined repetitions.

Another example of a blind decoding count mode, similar to the above example, may include soft combining a first repetition of a DCI (e.g., carried in a first PDCCH candidate 215) with a second repetition of the DCI (e.g., carried in a second PDCCH candidate 220). UE 210 may attempt to blindly decode the one or more repetitions of the PDCCH by incrementing a blind decoding count by a number for each soft combining. That is, UE 210 may soft combine the first repetition with the second repetition and attempt to blind decode the soft combined repetitions (e.g., the soft combined PDCCHs 225). In this blind decoding count mode example, this may count as a non-integer number between one and two blind decoding attempts and the blind decoding counter may be incremented by the non-integer number. Accordingly, the blind decoding count mode may include a first repetition and a second repetition being soft combined and only one decoding attempt made on the combined repetitions, with the blind decoding counter being incremented by the non-integer number (e.g., 1.1, 1.25, 1.33, 1.5, 1.75, or any other non-integer number between one and two). It is to be understood that other non-integer number count mode examples may be adopted according to the techniques described herein. Again, the blind decoding count mode may be known (e.g., configured in the relevant specification), indicated by UE 210 to base station 205, and/or configured for UE 210 by base station 205 (e.g., via RRC signaling, a MAC CE, a DCI, etc.). This blind decoding count mode may be supported because, even though UE 210 only performs one polar decoding after soft combining the repetitions, the complexity involved may be more than one blind decoding attempt in the normal case (e.g., UE 210 may still need to perform two resource element (RE) demappings, two demodulations, etc.).

Another example of a blind decoding count mode may include attempting to blind decode a first repetition of a DCI (e.g., carried in a first PDCCH candidate 215) and a second repetition of the DCI (e.g., carried in a second PDCCH candidate 220). UE 210 may attempt to blind the code the first and second repetitions of the PDCCH by incrementing a blind decoding count by one for each blind decoding attempt. That is, UE 210 may not soft combine the first repetition with the second repetition, but may instead attempt to blind decode each repetition separately. In this blind decoding count mode example, this may count as one blind decoding for each blind decoding attempt. Accordingly, the blind decoding counter may be incremented by one for each blind decoding attempt, which would be two in this example. Thus, the blind decoding count mode may include a first repetition and a second repetition corresponding to two blind decoding attempts.

Another example of a blind decoding count mode may include attempting to blind decode a first repetition of a DCI (e.g., carried in a first PDCCH candidate 215, which may correspond to the first repetition received in time and/or frequency). The first repetition is then soft combined with a second repetition of the DCI (e.g., carried in a second PDCCH candidate 220) and UE 210 then attempts to blind decode the soft combined repetitions. UE 210 may attempt to blind decode the first repetition of the PDCCH and soft combining the first and second repetitions by incrementing a blind decoding count by one for each blind decoding attempt and by one for the soft combined attempted blind decoding attempt.

That is, UE 210 may first attempt to blind decode the first repetition received in the time and/or frequency domain. UE 210 may then soft combine the first repetition with the second repetition and attempt to blind decode the combined repetitions. In this blind decoding count mode example, this may count as one blind decoding for each blind decoding attempt and as one blind decoding for the blind decoding attempt on the combined repetitions. Accordingly, the blind decoding counter may be incremented by one for each blind decoding attempt and by one for each soft combined blind decoding attempt, which would be two in this example. Accordingly, the blind decoding count mode may include a first repetition corresponding to one blind decoding attempt and the soft combined repetitions corresponding to another (e.g., one) blind decoding attempt.

Another example of a blind decoding count mode may include attempting to blind decode a first repetition of a DCI (e.g., carried in a first PDCCH candidate 215) and a second repetition of the DCI (e.g., carried in a second PDCCH candidate 220). UE 210 may then soft combine the first and second repetitions and attempt to blind decode the combined repetitions (e.g., the soft combined PDCCHs 225).

That is, UE 210 may first attempt to blind decode the first repetition received in the time and/or frequency domain. UE 210 may then attempt to blind decode the second repetition received in the time and/or frequency domain. UE 210 may then soft combine the first repetition with the second repetition and attempt to blind decode the combined repetitions. In this blind decoding count mode example, this may count as one blind decoding for each blind decoding attempt and as one blind decoding for the blind decoding attempt on the combined repetitions. Accordingly, the blind decoding counter may be incremented by one for each blind decoding attempt and by one for each soft combined blind decoding attempt, which would be three in this example. Accordingly, the blind decoding count mode may include a first repetition corresponding to one blind decoding attempt, a second repetition corresponding to another (e.g., one) blind decoding attempt, and the blind decoding of the soft combined repetitions corresponding to another (e.g., one) blind decoding attempt.

Another example of a blind decoding count mode, similar to the above example, may include attempting to blind decode a first repetition of a DCI (e.g., carried in a first PDCCH candidate 215) and a second repetition of the DCI (e.g., carried in a second PDCCH candidate 220). UE 210 may then soft combine the first and second repetitions and attempt to blind decode the combined repetitions (e.g., the soft combined PDCCHs 225).

That is, UE 210 may first attempt to blind decode the first repetition received in the time and/or frequency domain. UE 210 may then attempt to blind decode the second repetition received in the time and/or frequency domain. UE 210 may then soft combine the first repetition with the second repetition and attempt to blind decode the combined repetitions. In this blind decoding count mode example, this may count as one blind decoding for each blind decoding attempt and as a non-integer number between zero and one blind decoding for the blind decoding attempt on the combined repetitions (e.g., 0.1, 0.25, 0.33, 0.5, 0.75, or any other non-integer number between zero and one). Accordingly, the blind decoding counter may be incremented by one for each blind decoding attempt and by the non-integer number for each soft combined blind decoding attempt, which would be between two and three in this example. Accordingly, the blind decoding count mode may include a first repetition corresponding to one blind decoding attempt, a second repetition corresponding to another (e.g., one) blind decoding attempt, and the blind decoding of the soft combined repetitions corresponding to another (e.g., the non-integer number) blind decoding attempt (e.g., 2.1, 2.25, 2.33, 2.5, 2.75, or any other non-integer number between two and three). This blind decoding count mode may be supported because the blind decoding represents complexity that UE 210 handles for PDCCH decoding. In this example (e.g., decode first candidate, decode second candidate, decode the soft combined repetitions), it is easier/less complex as compared to attempting to blind decode three independent PDCCH candidates. This may be due to, for decoding the soft combined repetitions, some of the operations are already completed (e.g., such as RE demapping, demodulation, etc.) and only the last step of decoding (e.g., polar decoding) needs to be performed by UE 210. Accordingly, instead of this approach being counted as three blind decoding attempts, it may be more appropriate to count the blind decoding attempts as a smaller number towards the blind decoding limit (e.g., anywhere between two and three).

Accordingly, UE 210 may determine the blind decoding count mode based on the configuration message. UE 210 may implement the decoding count mode when counting the number of blind decoding attempts in repetition-based PDCCH candidates. UE 210 may then monitor for one or more repetitions of the DCI by attempting to blind decode the one or more repetitions of a PDCCH candidate in accordance with the maximum blind decode count and the blind decoding count mode. That is, UE 210 may attempt to recover one or more repetitions of the DCI conveyed in the first PDCCH candidate 215, the second PDCCH candidate 220, and the like, for the repetition-based PDCCH candidates. If a recovery attempt is successful (e.g., CRC passes), UE 210 may recover the information indicated in the DCI. If the recovery attempt is unsuccessful, UE 210 may increment one or more blind decode counts according to the blind decoding count mode discussed above.

Figure 3:
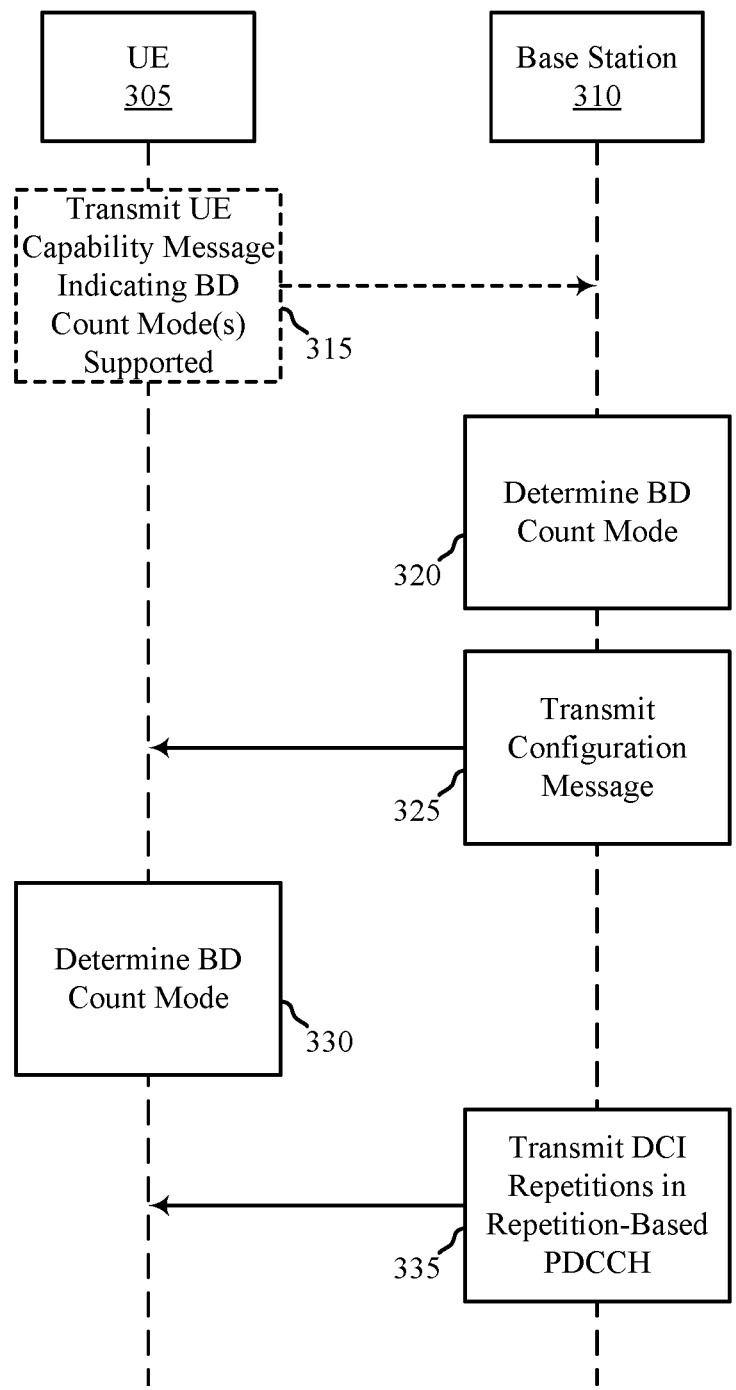
FIG. 3 illustrates an example of a process that supports blind decoding counting for repetition-based PDCCH candidates in accordance with aspects of the present disclosure.

FIG. 3 illustrates an example of a process 300 that supports blind decoding counting for repetition-based PDCCH candidates in accordance with aspects of the present disclosure. In some examples, process 300 may implement aspects of wireless communication systems 100 and/or 200. Aspects of process 300 may be implemented at or implemented by UE 305 and/or base station 310, which may be examples of the corresponding devices described herein.

At 315, UE 305 may optionally transmit or otherwise provide (and base station 310 may optionally receive or otherwise obtain) a UE capability message indicating information associated with blind decoding operations supported by UE 305 when performing blind decoding attempts of repetition-based PDCCH candidates. The UE capability message may be transmitted initially (e.g., during initial connection establishment) and/or after initial connection. UE 305 may update the UE capability by transmitting a second UE capability message changing one or more capabilities supported by UE 305. In some aspects, the UE capability message may carry or otherwise convey an indication of a set of blind decoding count modes that UE 305 supports, the number of repetitions of the DCI associated with the blind decoding operations, and the like.

At 320, base station 310 may determine a blind decoding count mode for UE 305. In some aspects, the blind decoding count mode may indicate a process for UE 305 to use for counting a number of blind decoding attempts repetition-based PDCCH candidates. In the example where the UE capability message is received by base station 310, the blind decoding count mode may be based, at least in some aspects, on the UE capability message.

At 325, base station 310 may transmit or otherwise provide (and UE 305 may receive or otherwise obtain) a configuration message including one or more parameters pertaining to blind decoding attempts by UE 305 of the repetition-based PDCCH candidates. The configuration message may be based, at least in some aspects, on the blind decoding count mode determined for UE 305. The configuration message may be transmitted or otherwise provided in RRC signaling, for example. The parameter(s) indicated in the configuration message may correspond to a number or some other indication of the blind decoding count mode to be applied by UE 305.

At 330, UE 305 may determine or otherwise identify the blind decoding count mode based on the configuration message from base station 310. As discussed, the blind decoding count mode may indicate the process for counting a number of blind decoding attempts repetition-based PDCCH candidates.

At 335, base station 310 may transmit or otherwise provide (and UE 305 may monitor for in order to receive or otherwise obtain) one or more repetitions of the DCI using the repetition-based PDCCH candidates. UE 305 may attempt to blind decode the one or more repetitions of the PDCCH in accordance with a maximum blind decode count (e.g., the blind decode or BD limit configured for UE 305) and the blind decoding count mode indicated by base station 310.

For example, this may include UE 305 identifying or otherwise determining that the blind decoding count mode includes soft combining a first repetition of the DCI with a second repetition of the DCI. In this example, UE 305 may attempt to blind decode the one or more repetitions of the PDCCH by incrementing a blind decode count by one for each soft combining (e.g., where UE 305 ensures that the blind decode count does not exceed the maximum blind decode count configured for UE 305). That is, UE 305 may soft combine the first repetition with the second repetition and then attempt to blind decode the soft combined repetitions. In this example, this may be considered a one blind decoding attempt according to the blind decoding count mode and the blind decoding count may be incremented by one.

In another example (similar to the above example), this may include UE 305 identifying or otherwise determining that the blind decoding count mode includes soft combining a first repetition of the DCI with a second repetition of the DCI. In this example, UE 305 may attempt to blind decode the one or more repetitions of the PDCCH by incrementing a blind decode count by a non-integer number between one and two (e.g., 1.1, 1.25, 1.33, 1.5, 1.75, or any other non-integer number between one and two) for each soft combining (e.g., where UE 305 ensures that the blind decode count does not exceed the maximum blind decode count configured for UE 305). That is, UE 305 may soft combine the first repetition with the second repetition and then attempt to blind decode the soft combined repetitions. In this example, this may be considered a non-integer number between one and two blind decoding attempts according to the blind decoding count mode and the blind decoding count may be incremented by the non-integer number.

In another example, this may include UE 305 identifying or otherwise determining that the blind decoding count mode includes attempting to blind decode a first repetition of the DCI and a second repetition of the DCI. In this example, UE 305 may attempt to blind decode the first repetition of the PDCCH and the second repetition of the PDCCH by incrementing a blind decode count by one for each attempted blind decode (e.g., where UE 305 ensures that the blind decode count does not exceed the maximum blind decode count configured for UE 305). That is, UE 305 may attempt to blind decode each repetition of the PDCCH (e.g., the DCI conveyed in the PDCCH candidate). In the example where there are two PDCCH candidates, this may be considered one blind decoding attempt according to the blind decoding count mode for each repetition (e.g., may be counted as one blind decoding attempts by UE 305).

In another example, this may include UE 305 identifying or otherwise determining that the blind decoding count mode includes attempting to blind decode a first repetition of the DCI and soft combining the first repetition with a second repetition of the DCI. In this example, UE 305 may attempt to blind decode the first repetition of the PDCCH and the soft combined first repetition and second repetition of the PDCCH by incrementing a blind decode count by one for each attempted blind decode and for each soft combining (e.g., where UE 305 ensures that the blind decode count does not exceed the maximum blind decode count configured for UE 305). That is, UE 305 may attempt to blind decode a first repetition of the DCI conveyed in a PDCCH corresponding to the first PDCCH candidate. UE 305 may then combine the first repetition with a second repetition and attempt to blind decode the soft combined repetitions. In this example, UE 305 may increment the blind decode count by one based on the attempted blind decoding of the first repetition and increment the blind decode count by one again based on the attempted blind decoding of the soft combined repetitions.

In another example, this may include UE 305 identifying or otherwise determining that the blind decoding count mode includes attempting to blind decode a first repetition of the PDCCH and a second repetition of the PDCCH, and then soft combining the first repetition and the second repetition. UE 305 may attempt to blind decode the first repetition of the PDCCH and the second repetition of the PDCCH. UE 305 may then soft combine the first repetition with the second repetition and attempt to blind decode the soft combined repetitions. Accordingly, UE 305 may increment the blind decode count by one for each attempted blind decode and for each soft combining (e.g., where UE 305 ensures that the blind decode count does not exceed the maximum blind decode count configured for UE 305). That is, UE 305 may increment the blind decode count based on the attempted blind decoding of the first repetition, increment the blind decode count again based on the attempted blind decoding of the second repetition, and increment the blind decode count once again (e.g., a third time) based on the attempted blind decoding of the soft combined repetitions.

In another example (similar to the above example), this may include UE 305 identifying or otherwise determining that the blind decoding count mode includes attempting to blind decode a first repetition of the PDCCH and a second repetition of the PDCCH, and then soft combining the first repetition and the second repetition. UE 305 may attempt to blind decode the first repetition of the PDCCH and the second repetition of the PDCCH. UE 305 may then soft combine the first repetition with the second repetition and attempt to blind decode the soft combined repetitions. Accordingly, UE 305 may increment the blind decode count by one for each attempted blind decode and by a non-integer number between zero and one for each soft combining (e.g., where UE 305 ensures that the blind decode count does not exceed the maximum blind decode count configured for UE 305). That is, UE 305 may increment the blind decode count by one based on the attempted blind decoding of the first repetition, increment the blind decode count by one again based on the attempted blind decoding of the second repetition, and increment the blind decode count by the non-integer number between zero and one (e.g., a third time) based on the attempted blind decoding of the soft combined repetitions.

In some aspects for repetition-based PDCCH candidates, UE 305 may increment the blind decoding count based on the indicated (e.g., indicated by base station 310 through configuration signaling and/or by UE 305 through the UE capability signaling) number (e.g., 1.0, 1.5, 2.0, 2.5, 3, etc., according to any of the examples discussed herein). That is, the incrementing of the blind decoding count may not necessarily be tied to how to perform blind decoding (whether and how to consider soft combining). Instead, the incrementing may only be relevant to how UE 305 counts the two or more repetition-based candidates (towards the blind decoding limit), and the rest of the incrementing (e.g., how UE 305 counts the soft combined repetitions) may be based on implementation at UE 305.

Accordingly, UE 305 may attempt to blind decode the repetition-based PDCCH candidates according to the blind decoding count mode indicated in the configuration message provided by base station 310.

Figure 4:
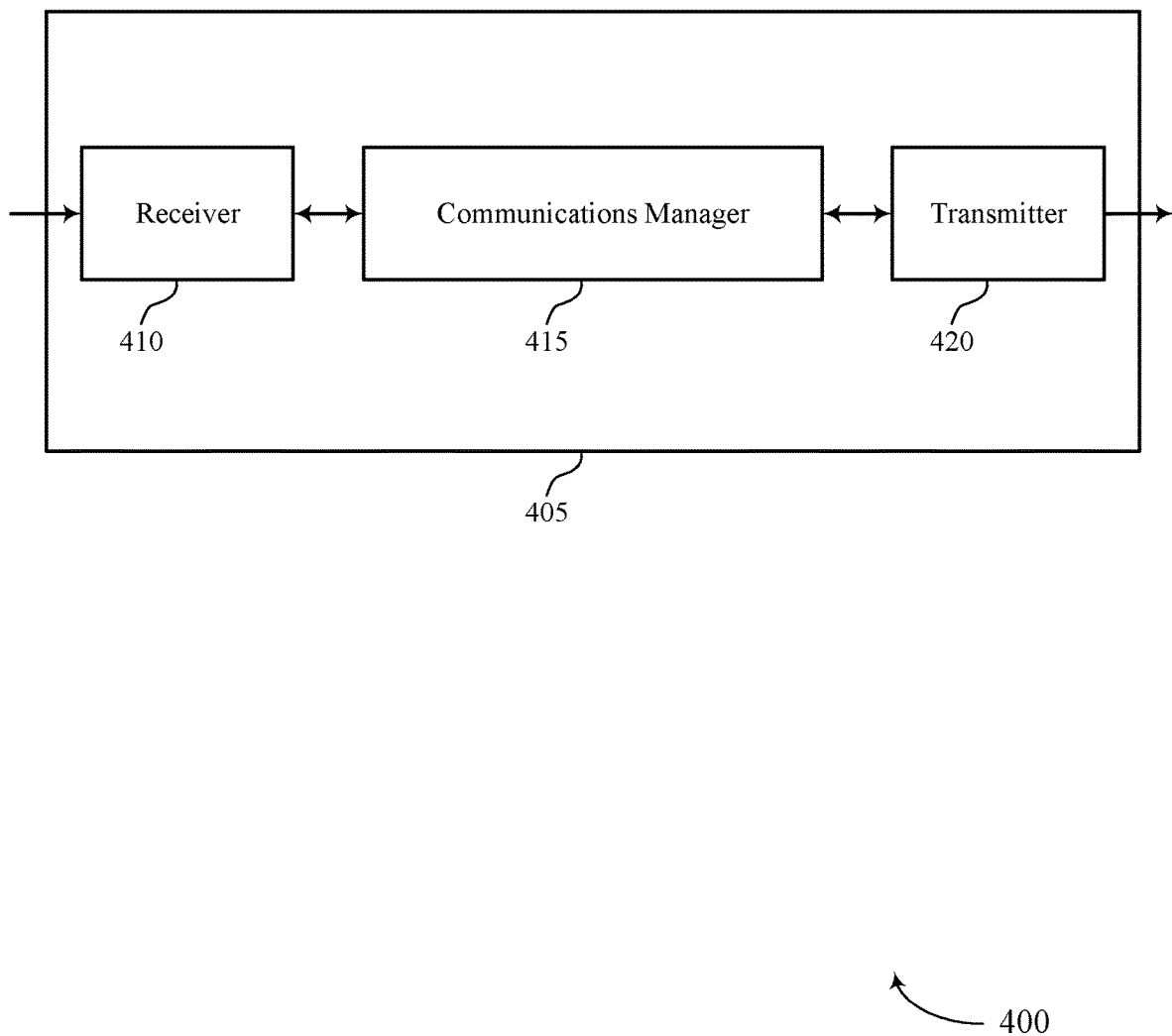
FIGS. 4 and 5 show block diagrams of devices that support blind decoding counting for repetition-based PDCCH candidates in accordance with aspects of the present disclosure.

FIG. 4 shows a block diagram 400 of a device 405 that supports blind decoding counting for repetition-based PDCCH candidates in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to blind decoding counting of repetition-based PDCCH candidates, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, a configuration message which includes one or more parameters pertaining to blind decoding attempts by the UE of repetition-based PDCCH candidates, determine, from the configuration message, a blind decoding count mode which indicates a process for counting a number of blind decoding attempts of repetition-based PDCCH candidates, and monitor for one or more repetitions of a DCI by attempting to blind decode the one or more repetitions of a PDCCH candidate in accordance with a maximum blind decode count and the blind decoding count mode. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
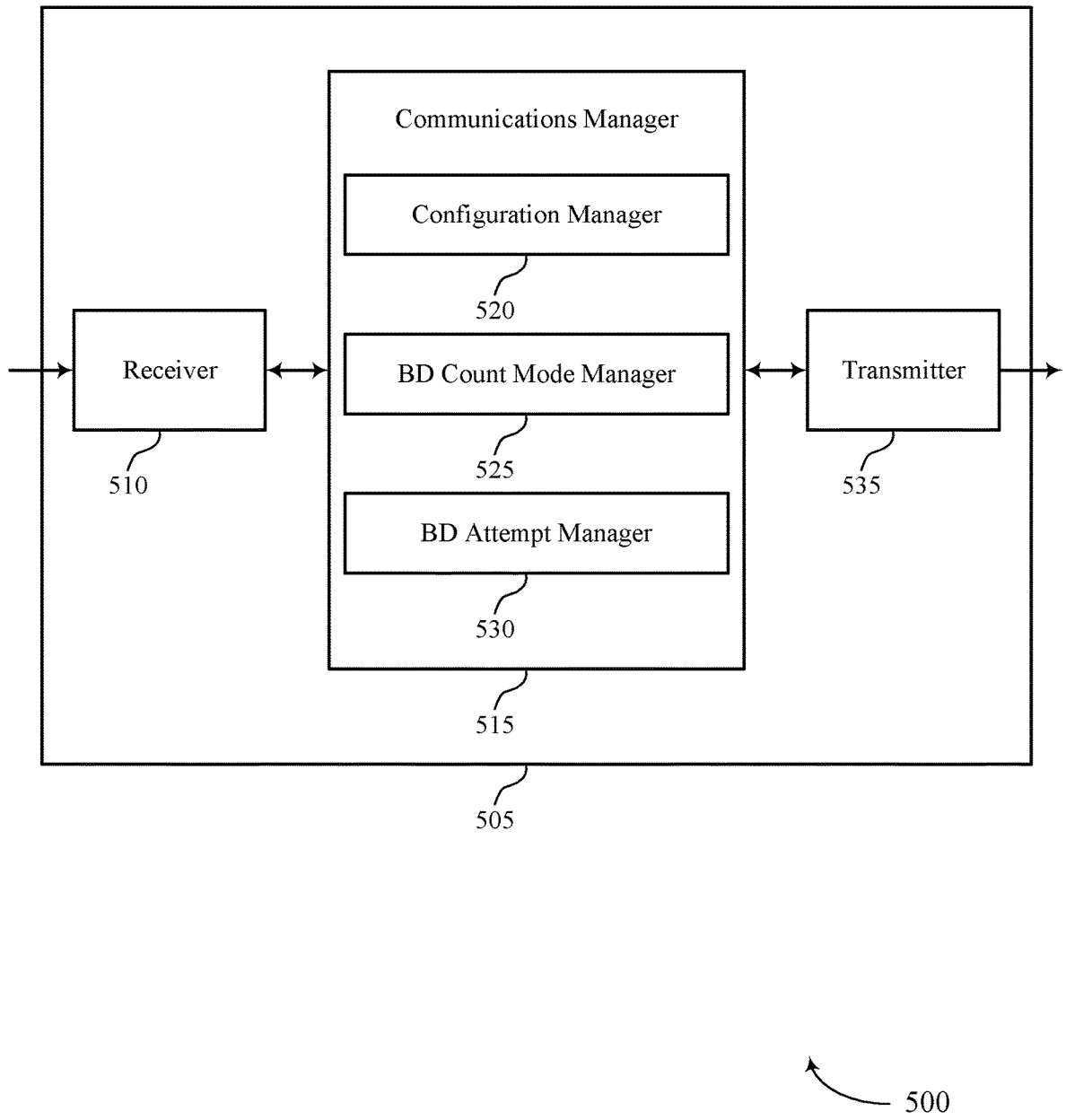

FIG. 5 shows a block diagram 500 of a device 505 that supports blind decoding counting for repetition-based PDCCH candidates in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to blind decoding counting of repetition-based PDCCH candidates, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration manager 520, a BD count mode manager 525, and a BD attempt manager 530. The communications manager 515 may be an example of aspects of the communications manager 710 described herein.

The configuration manager 520 may receive, from a base station, a configuration message which includes one or more parameters pertaining to blind decoding attempts by the UE of repetition-based PDCCH candidates.

The BD count mode manager 525 may determine, from the configuration message, a blind decoding count mode which indicates a process for counting a number of blind decoding attempts of repetition-based PDCCH candidates.

The BD attempt manager 530 may monitor for one or more repetitions of a DCI by attempting to blind decode the one or more repetitions of a PDCCH candidate in accordance with a maximum blind decode count and the blind decoding count mode.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
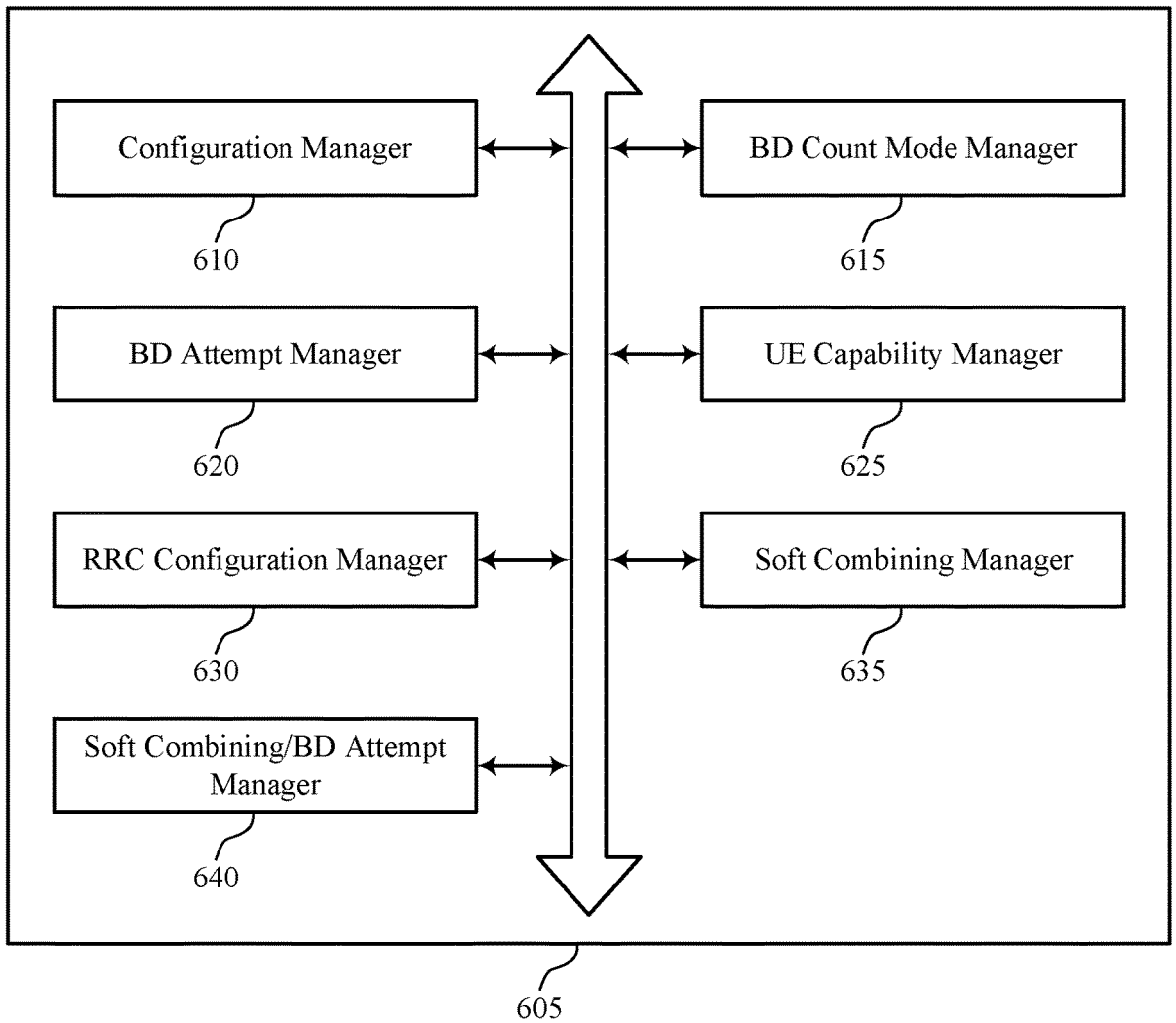
FIG. 6 shows a block diagram of a communications manager that supports blind decoding counting for repetition-based PDCCH candidates in accordance with aspects of the present disclosure.

FIG. 6 shows a block diagram 600 of a communications manager 605 that supports blind decoding counting for repetition-based PDCCH candidates in accordance with aspects of the present disclosure. The communications manager 605 may be an example of aspects of a communications manager 415, a communications manager 515, or a communications manager 710 described herein. The communications manager 605 may include a configuration manager 610, a BD count mode manager 615, a BD attempt manager 620, a UE capability manager 625, an RRC configuration manager 630, a soft combining manager 635, and a soft combining/BD attempt manager 640. Each of these modules may communicate, directly or indirectly, with one another (e.g., via one or more buses).

The configuration manager 610 may receive, from a base station, a configuration message which includes one or more parameters pertaining to blind decoding attempts by the UE of repetition-based PDCCH candidates. In some cases, the repetition-based PDCCH candidates include a set of PDCCH candidates in a same search space set, the same search space set associated with a common CORESET or with separate CORESETs.

The BD count mode manager 615 may determine, from the configuration message, a blind decoding count mode which indicates a process for counting a number of blind decoding attempts of repetition-based PDCCH candidates.

The BD attempt manager 620 may monitor for one or more repetitions of a DCI by attempting to blind decode the one or more repetitions of a PDCCH candidate in accordance with a maximum blind decode count and the blind decoding count mode. In some examples, identifying that the blind decoding count mode includes attempting to blind decode a first repetition of the DCI and a second repetition of the DCI. In some examples, the BD attempt manager 620 may attempt to blind decode the first repetition of the PDCCH and the second repetition of the PDCCH by incrementing a blind decode count by one for each attempted blind decode, the blind decode count not to exceed the maximum blind decode count.

The UE capability manager 625 may transmit a UE capability message indicating information associated with blind decoding operations supported by the UE when performing blind decoding attempts of the repetition-based PDCCH candidates, where the configuration message is based on the UE capability message. In some cases, the information associated with the blind decoding operations supported by the UE includes at least one of a set of blind decoding count modes that the UE supports, a number of repetitions of the DCI associated with the blind decoding operations, or both.

The RRC configuration manager 630 may receive the configuration message in RRC signaling.

The soft combining manager 635 may identify that the blind decoding count mode includes soft combining a first repetition of the DCI with a second repetition of the DCI. In some examples, the soft combining manager 635 may attempt to blind decode the one or more repetitions of the PDCCH by incrementing a blind decode count by one for each soft combining, the blind decode count to not exceed the maximum blind decode count.

The soft combining/BD attempt manager 640 may identify that the blind decoding count mode includes attempting to blind decode a first repetition of the DCI and soft combining the first repetition of the DCI with a second repetition of the DCI. In some examples, the soft combining/BD attempt manager 640 may attempt to blind decode the first repetition of the PDCCH and soft combining the first repetition of the PDCCH with the second repetition of the PDCCH by incrementing a blind decode count by one for each attempted blind decode and for each soft combining, the blind decode count not to exceed the maximum blind decode count. In some examples, identifying that the blind decoding count mode includes attempting to blind decode a first repetition of the PDCCH and a second repetition of the PDCCH and soft combining the first repetition of the DCI with the second repetition of the DCI. In some examples, the soft combining/BD attempt manager 640 may attempt to blind decode the first repetition of the PDCCH and the second repetition of the PDCCH and soft combining the first repetition of the PDCCH and the second repetition of the PDCCH by incrementing a blind decode count by one for each attempted blind decode and for each soft combining, the blind decode count not to exceed the maximum blind decode count.

Figure 7:
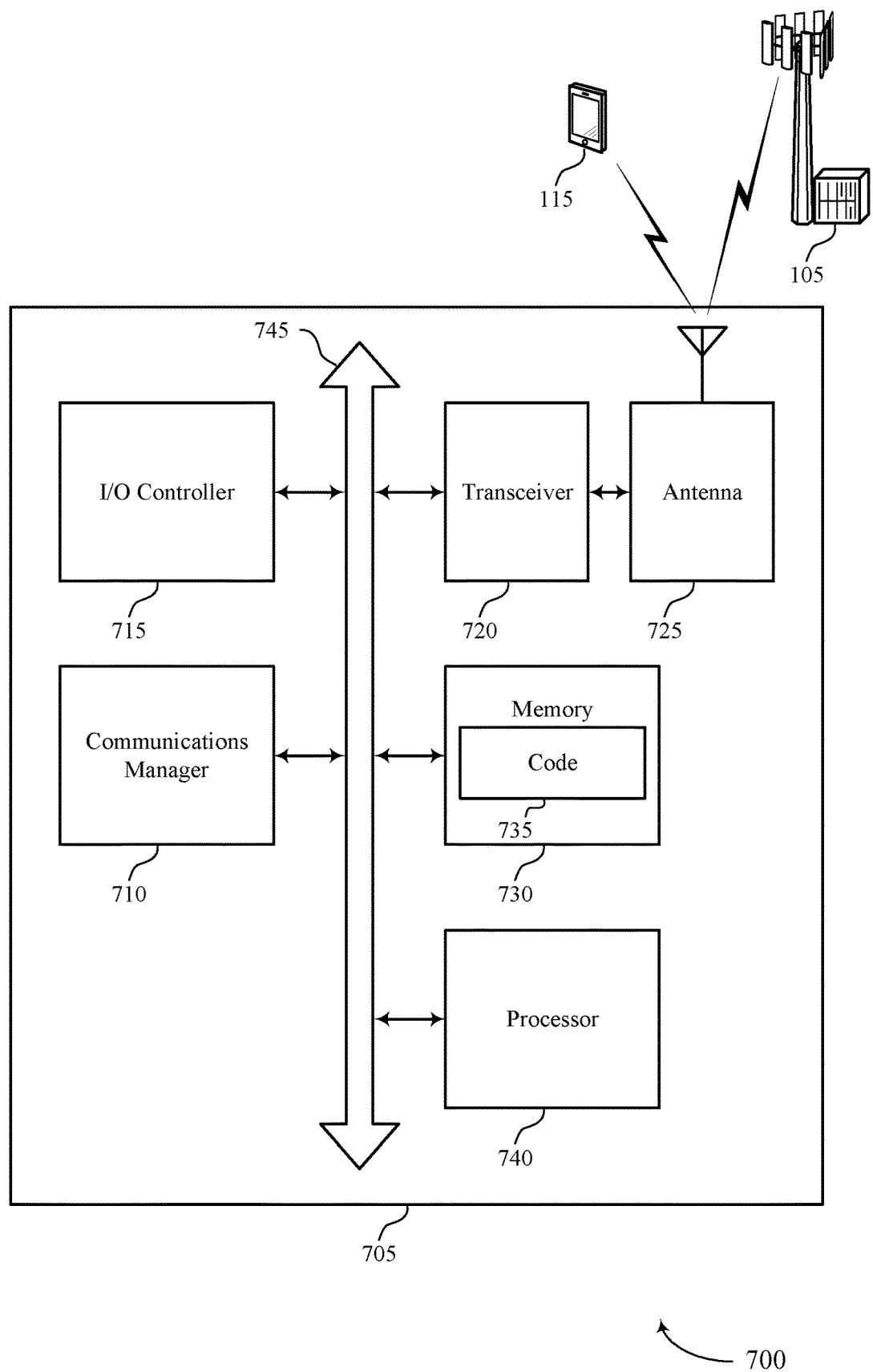
FIG. 7 shows a diagram of a system including a device that supports blind decoding counting for repetition-based PDCCH candidates in accordance with aspects of the present disclosure.

FIG. 7 shows a diagram of a system 700 including a device 705 that supports blind decoding counting for repetition-based PDCCH candidates in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, a configuration message which includes one or more parameters pertaining to blind decoding attempts by the UE of repetition-based PDCCH candidates, determine, from the configuration message, a blind decoding count mode which indicates a process for counting a number of blind decoding attempts of repetition-based PDCCH candidates, and monitor for one or more repetitions of a DCI by attempting to blind decode the one or more repetitions of a PDCCH candidate in accordance with a maximum blind decode count and the blind decoding count mode.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting blind decoding counting of repetition-based PDCCH candidates).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
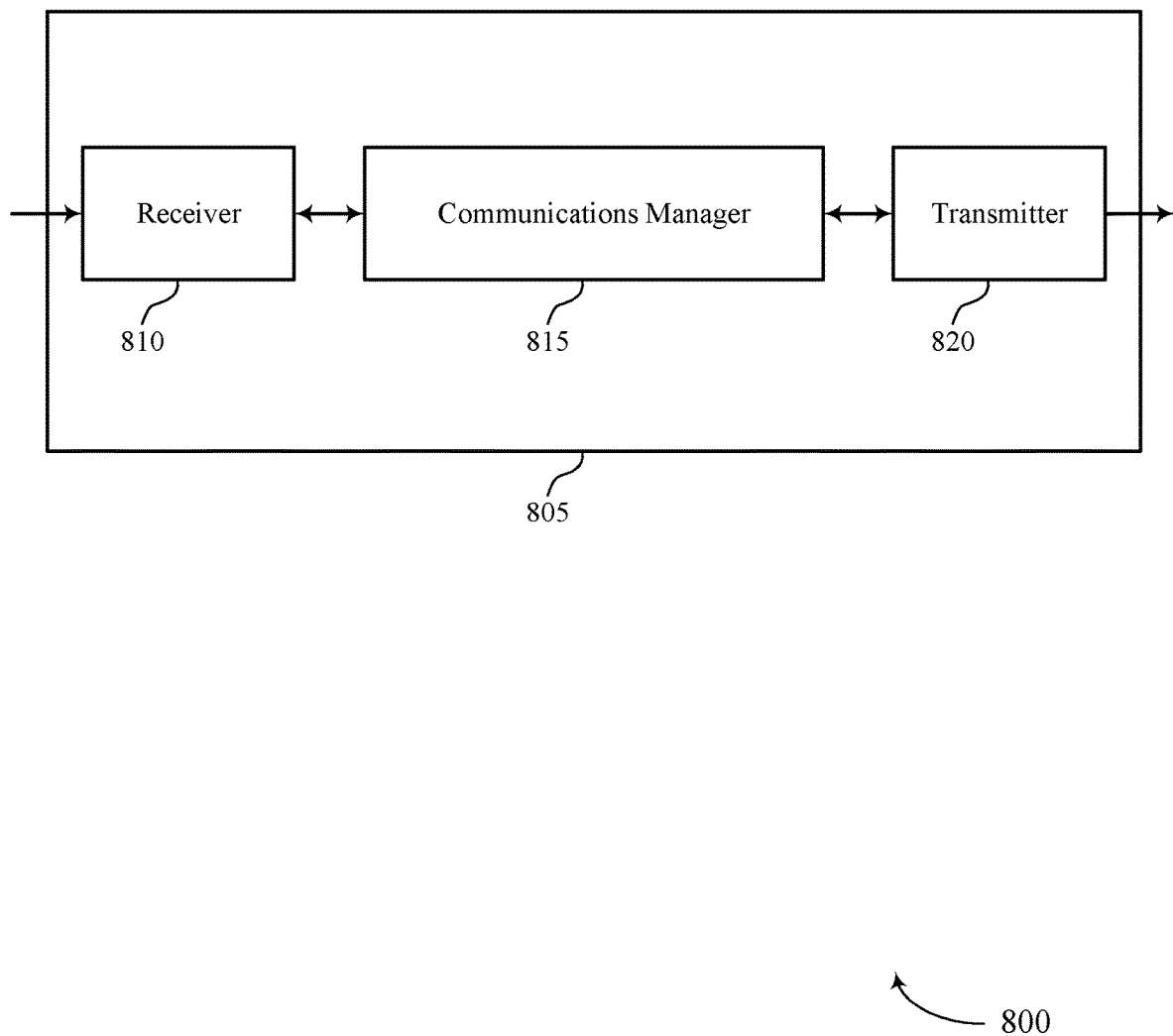
FIGS. 8 and 9 show block diagrams of devices that support blind decoding counting for repetition-based PDCCH candidates in accordance with aspects of the present disclosure.

FIG. 8 shows a block diagram 800 of a device 805 that supports blind decoding counting for repetition-based PDCCH candidates in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to blind decoding counting of repetition-based PDCCH candidates, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine, for a UE, a blind decoding count mode which indicates a process for the UE to use for counting a number of blind decoding attempts of repetition-based PDCCH candidates, transmit, to the UE and based on the blind decoding count mode, a configuration message which includes one or more parameters pertaining to blind decoding attempts by the UE of the repetition-based PDCCH candidates, and transmit one or more repetitions of a DCI to the UE using the repetition-based PDCCH candidates, where the UE attempts to blind decode the one or more repetitions of a PDCCH candidate in accordance with a maximum blind decode count and the blind decoding count mode. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
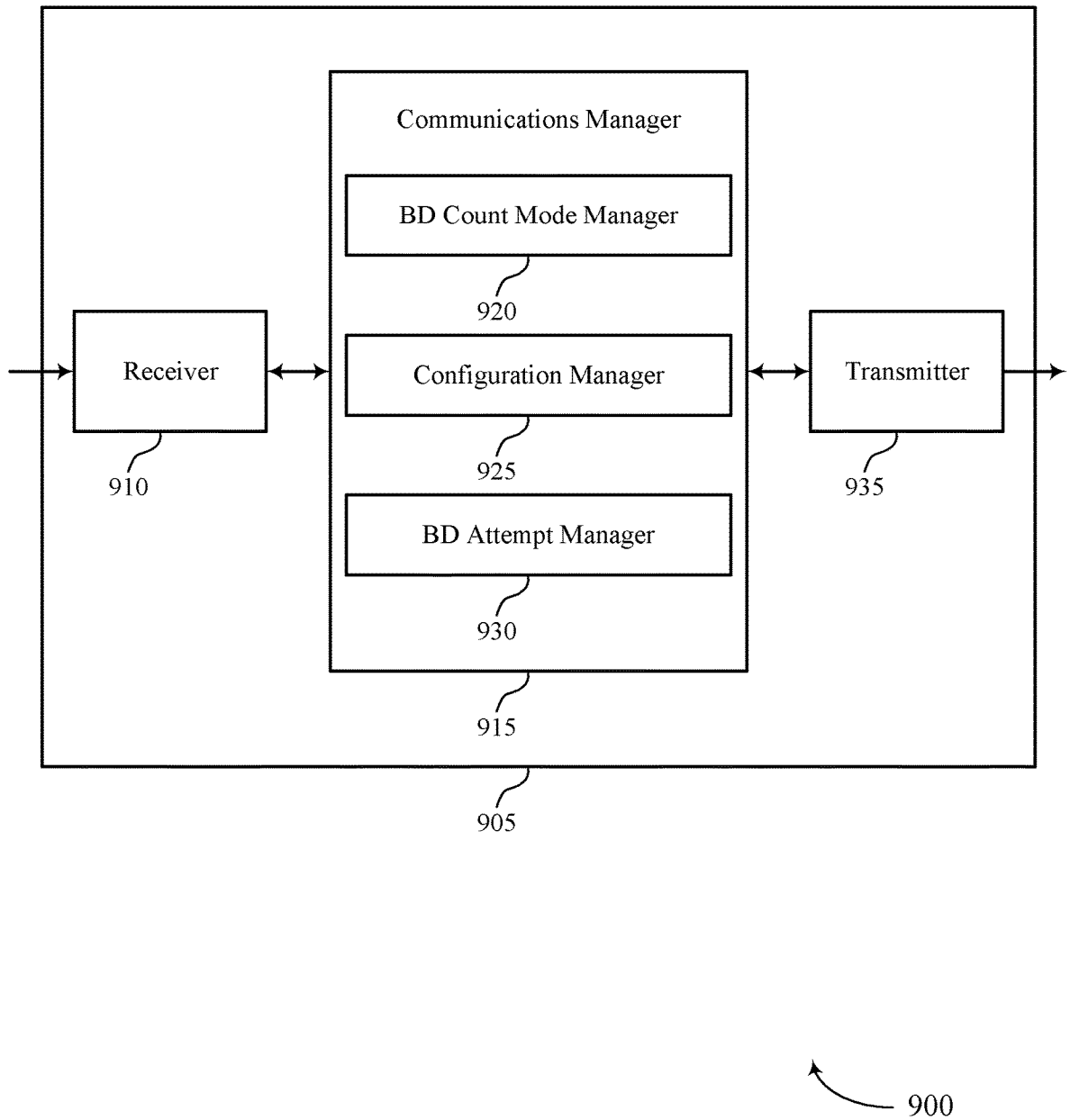

FIG. 9 shows a block diagram 900 of a device 905 that supports blind decoding counting for repetition-based PDCCH candidates in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to blind decoding counting of repetition-based PDCCH candidates, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a BD count mode manager 920, a configuration manager 925, and a BD attempt manager 930. The communications manager 915 may be an example of aspects of the communications manager 1110 described herein.

The BD count mode manager 920 may determine, for a UE, a blind decoding count mode which indicates a process for the UE to use for counting a number of blind decoding attempts of repetition-based PDCCH candidates.

The configuration manager 925 may transmit, to the UE and based on the blind decoding count mode, a configuration message which includes one or more parameters pertaining to blind decoding attempts by the UE of the repetition-based PDCCH candidates.

The BD attempt manager 930 may transmit one or more repetitions of a DCI to the UE using the repetition-based PDCCH candidates, where the UE attempts to blind decode the one or more repetitions of a PDCCH candidate in accordance with a maximum blind decode count and the blind decoding count mode.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
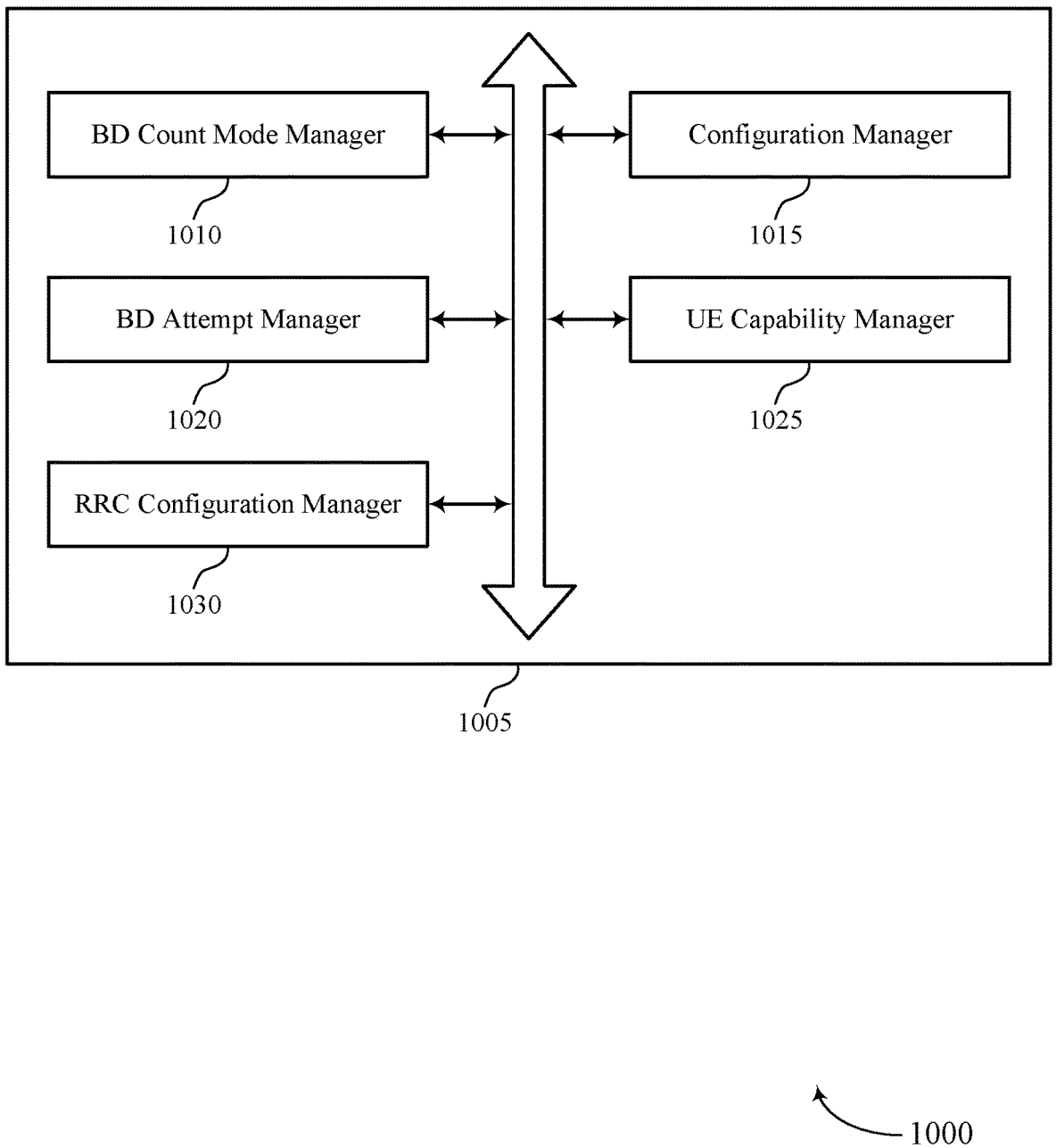
FIG. 10 shows a block diagram of a communications manager that supports blind decoding counting for repetition-based PDCCH candidates in accordance with aspects of the present disclosure.

FIG. 10 shows a block diagram 1000 of a communications manager 1005 that supports blind decoding counting for repetition-based PDCCH candidates in accordance with aspects of the present disclosure. The communications manager 1005 may be an example of aspects of a communications manager 815, a communications manager 915, or a communications manager 1110 described herein. The communications manager 1005 may include a BD count mode manager 1010, a configuration manager 1015, a BD attempt manager 1020, a UE capability manager 1025, and an RRC configuration manager 1030. Each of these modules may communicate, directly or indirectly, with one another (e.g., via one or more buses).

The BD count mode manager 1010 may determine, for a UE, a blind decoding count mode which indicates a process for the UE to use for counting a number of blind decoding attempts of repetition-based PDCCH candidates.

The configuration manager 1015 may transmit, to the UE and based on the blind decoding count mode, a configuration message which includes one or more parameters pertaining to blind decoding attempts by the UE of the repetition-based PDCCH candidates.

In some cases, the repetition-based PDCCH candidates include a set of PDCCH candidates in a same search space set, the same search space set associated with a common CORESET or separate CORESETs.

The BD attempt manager 1020 may transmit one or more repetitions of a DCI to the UE using the repetition-based PDCCH candidates, where the UE attempts to blind decode the one or more repetitions of a PDCCH candidate in accordance with a maximum blind decode count and the blind decoding count mode.

The UE capability manager 1025 may receive a UE capability message from the UE indicating information associated with blind decoding operations that the UE supports when performing blind decoding attempts of the repetition-based PDCCH candidates, where the configuration message is based on the UE capability message. In some cases, the information associated with the blind decoding operations that the UE supports includes at least one of a set of blind decoding count modes that the UE supports, a number of repetitions of the DCI associated with the blind decoding operations, or both.

The RRC configuration manager 1030 may control, monitor, or otherwise manage aspects of the configuration message being transmitted in RRC signaling.

Figure 11:
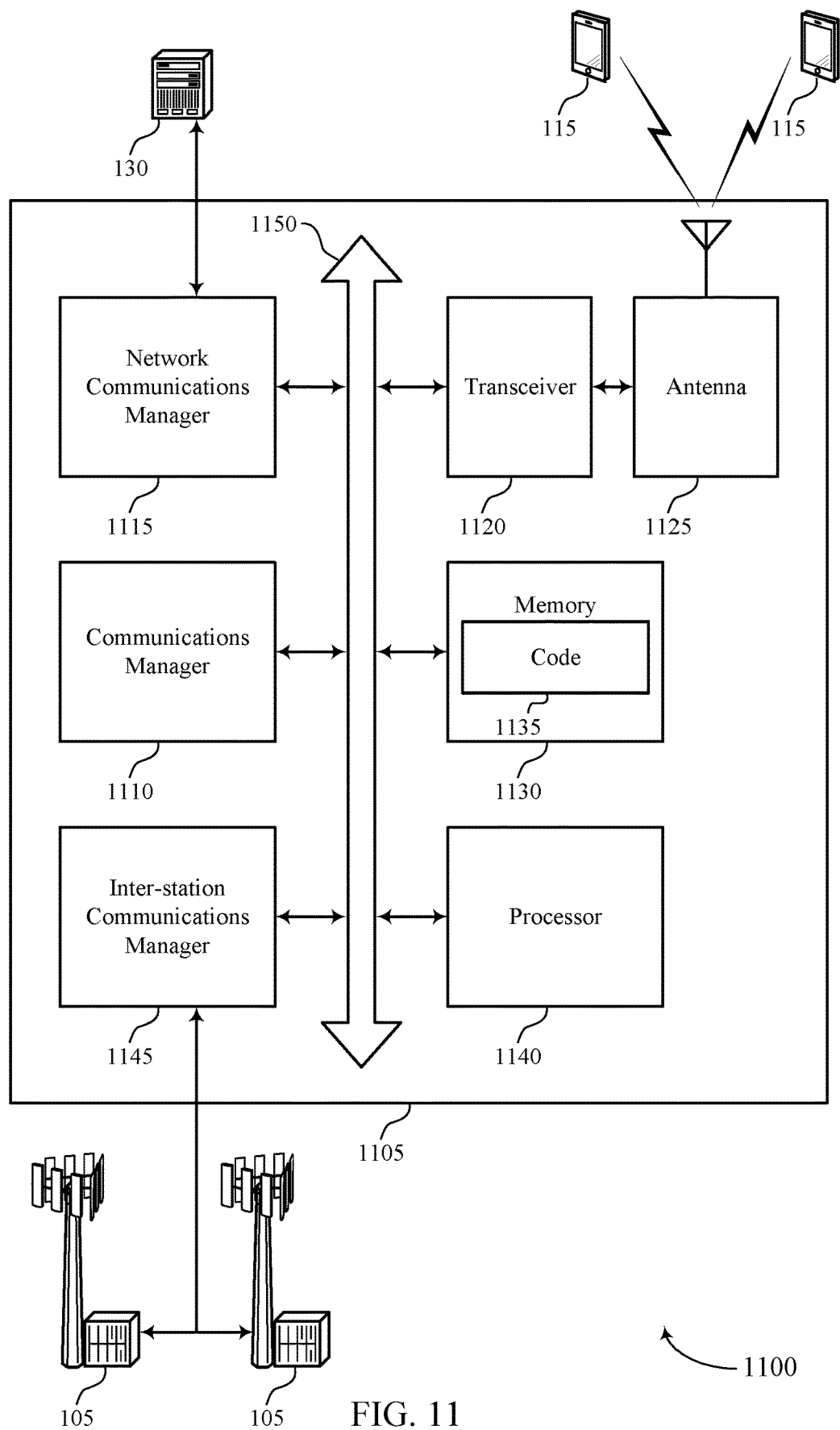
FIG. 11 shows a diagram of a system including a device that supports blind decoding counting for repetition-based PDCCH candidates in accordance with aspects of the present disclosure.

FIG. 11 shows a diagram of a system 1100 including a device 1105 that supports blind decoding counting for repetition-based PDCCH candidates in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine, for a UE, a blind decoding count mode which indicates a process for the UE to use for counting a number of blind decoding attempts of repetition-based PDCCH candidates, transmit, to the UE and based on the blind decoding count mode, a configuration message which includes one or more parameters pertaining to blind decoding attempts by the UE of the repetition-based PDCCH candidates, and transmit one or more repetitions of a DCI to the UE using the repetition-based PDCCH candidates, where the UE attempts to blind decode the one or more repetitions of a PDCCH candidate in accordance with a maximum blind decode count and the blind decoding count mode.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting blind decoding counting of repetition-based PDCCH candidates).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
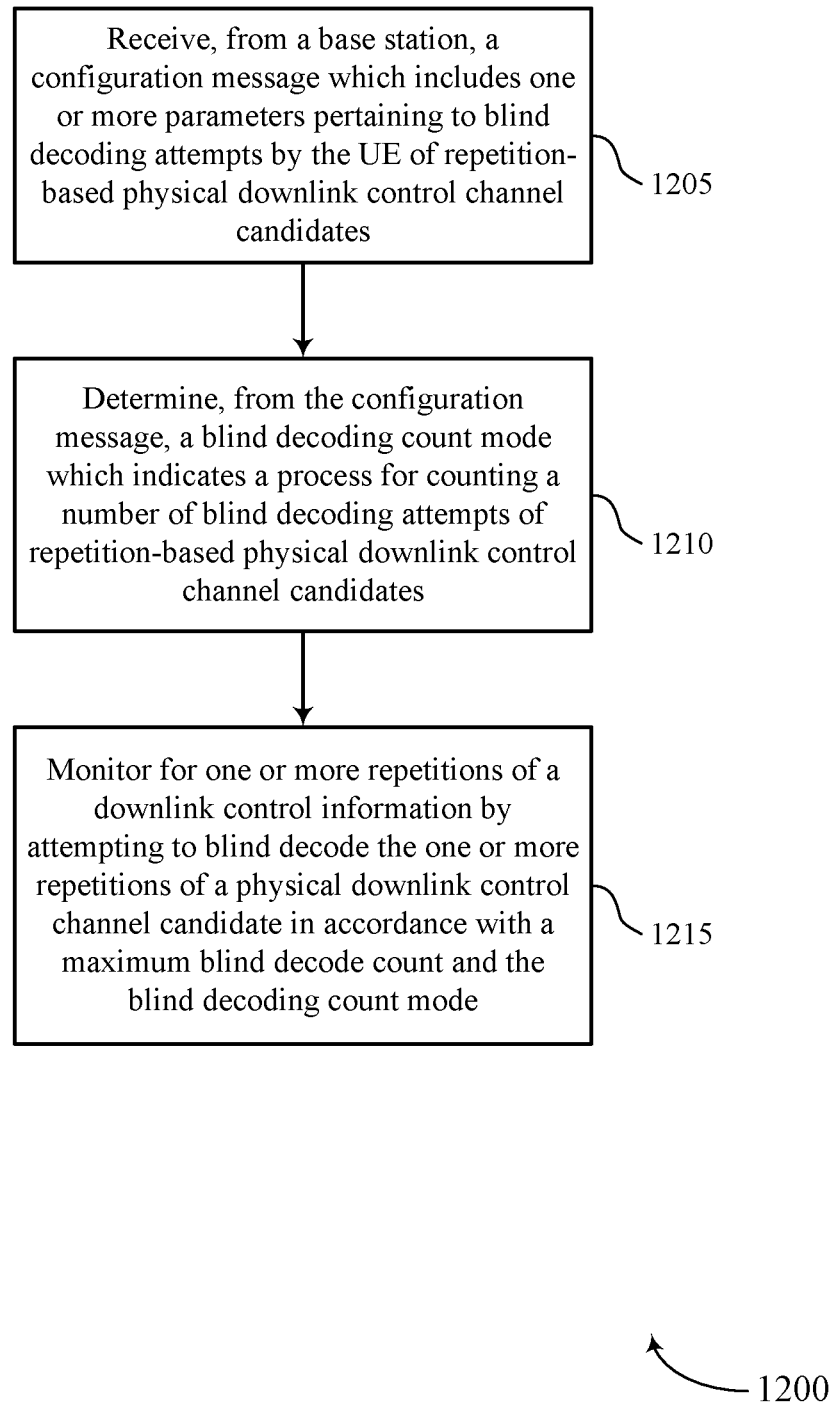
FIGS. 12 through 15 show flowcharts illustrating methods that support blind decoding counting for repetition-based PDCCH candidates in accordance with aspects of the present disclosure.

FIG. 12 shows a flowchart illustrating a method 1200 that supports blind decoding counting for repetition-based PDCCH candidates in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may receive, from a base station, a configuration message which includes one or more parameters pertaining to blind decoding attempts by the UE of repetition-based PDCCH candidates. The operations of 1205 may be performed according to the methods described herein. In some examples, aspects of the operations of 1205 may be performed by a configuration manager as described with reference to FIGS. 4 through 7.

At 1210, the UE may determine, from the configuration message, a blind decoding count mode which indicates a process for counting a number of blind decoding attempts of repetition-based PDCCH candidates. The operations of 1210 may be performed according to the methods described herein. In some examples, aspects of the operations of 1210 may be performed by a BD count mode manager as described with reference to FIGS. 4 through 7.

At 1215, the UE may monitor for one or more repetitions of a DCI by attempting to blind decode the one or more repetitions of a PDCCH candidate in accordance with a maximum blind decode count and the blind decoding count mode. The operations of 1215 may be performed according to the methods described herein. In some examples, aspects of the operations of 1215 may be performed by a BD attempt manager as described with reference to FIGS. 4 through 7.

Figure 13:
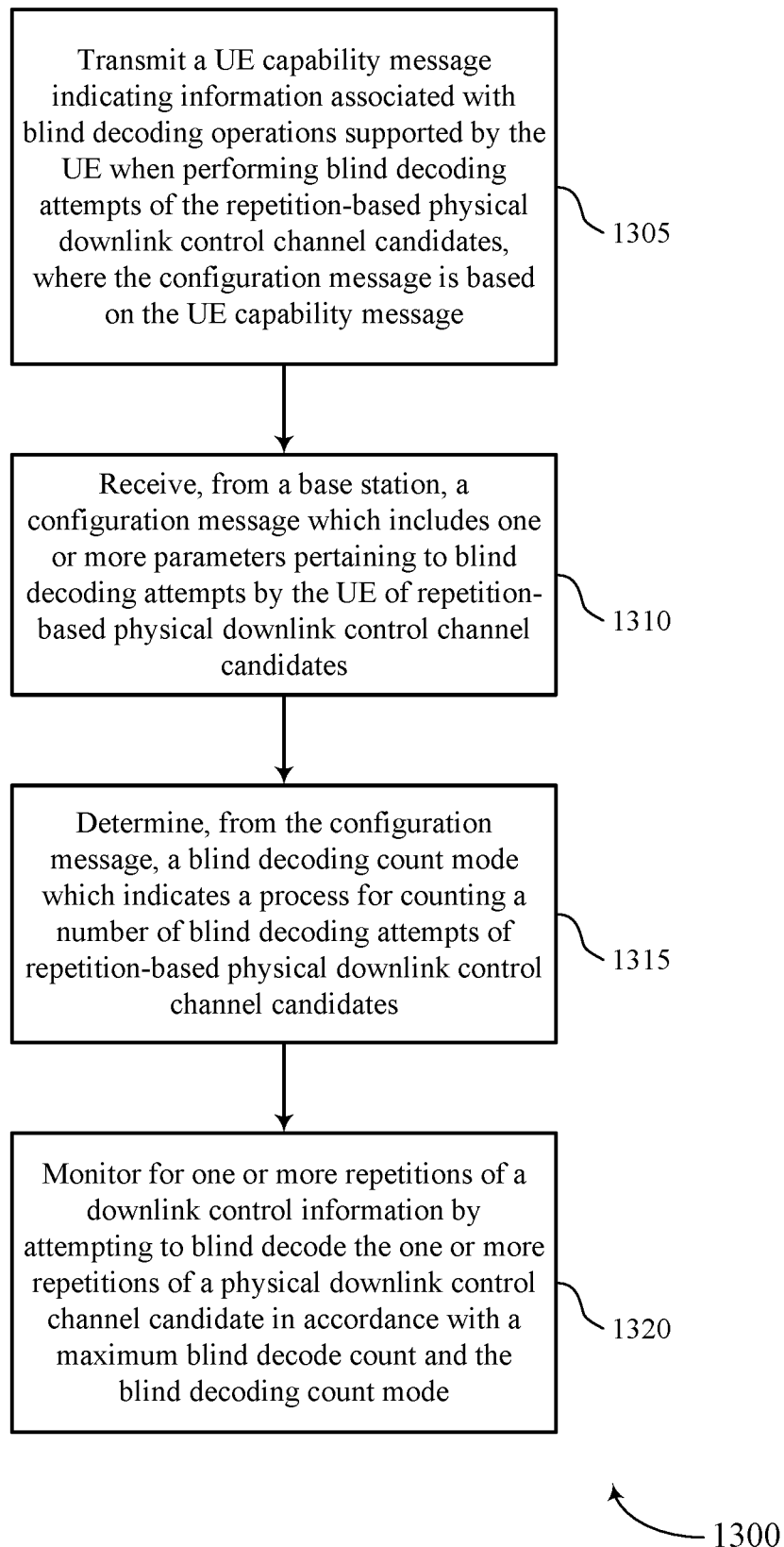

FIG. 13 shows a flowchart illustrating a method 1300 that supports blind decoding counting of repetition-based PDCCH candidates in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may transmit a UE capability message indicating information associated with blind decoding operations supported by the UE when performing blind decoding attempts of the repetition-based PDCCH candidates, where the configuration message is based on the UE capability message. The operations of 1305 may be performed according to the methods described herein. In some examples, aspects of the operations of 1305 may be performed by a UE capability manager as described with reference to FIGS. 4 through 7.

At 1310, the UE may receive, from a base station, a configuration message which includes one or more parameters pertaining to blind decoding attempts by the UE of repetition-based PDCCH candidates. The operations of 1310 may be performed according to the methods described herein. In some examples, aspects of the operations of 1310 may be performed by a configuration manager as described with reference to FIGS. 4 through 7.

At 1315, the UE may determine, from the configuration message, a blind decoding count mode which indicates a process for counting a number of blind decoding attempts of repetition-based PDCCH candidates. The operations of 1315 may be performed according to the methods described herein. In some examples, aspects of the operations of 1315 may be performed by a BD count mode manager as described with reference to FIGS. 4 through 7.

At 1320, the UE may monitor for one or more repetitions of a DCI by attempting to blind decode the one or more repetitions of a PDCCH candidate in accordance with a maximum blind decode count and the blind decoding count mode. The operations of 1320 may be performed according to the methods described herein. In some examples, aspects of the operations of 1320 may be performed by a BD attempt manager as described with reference to FIGS. 4 through 7.

Figure 14:
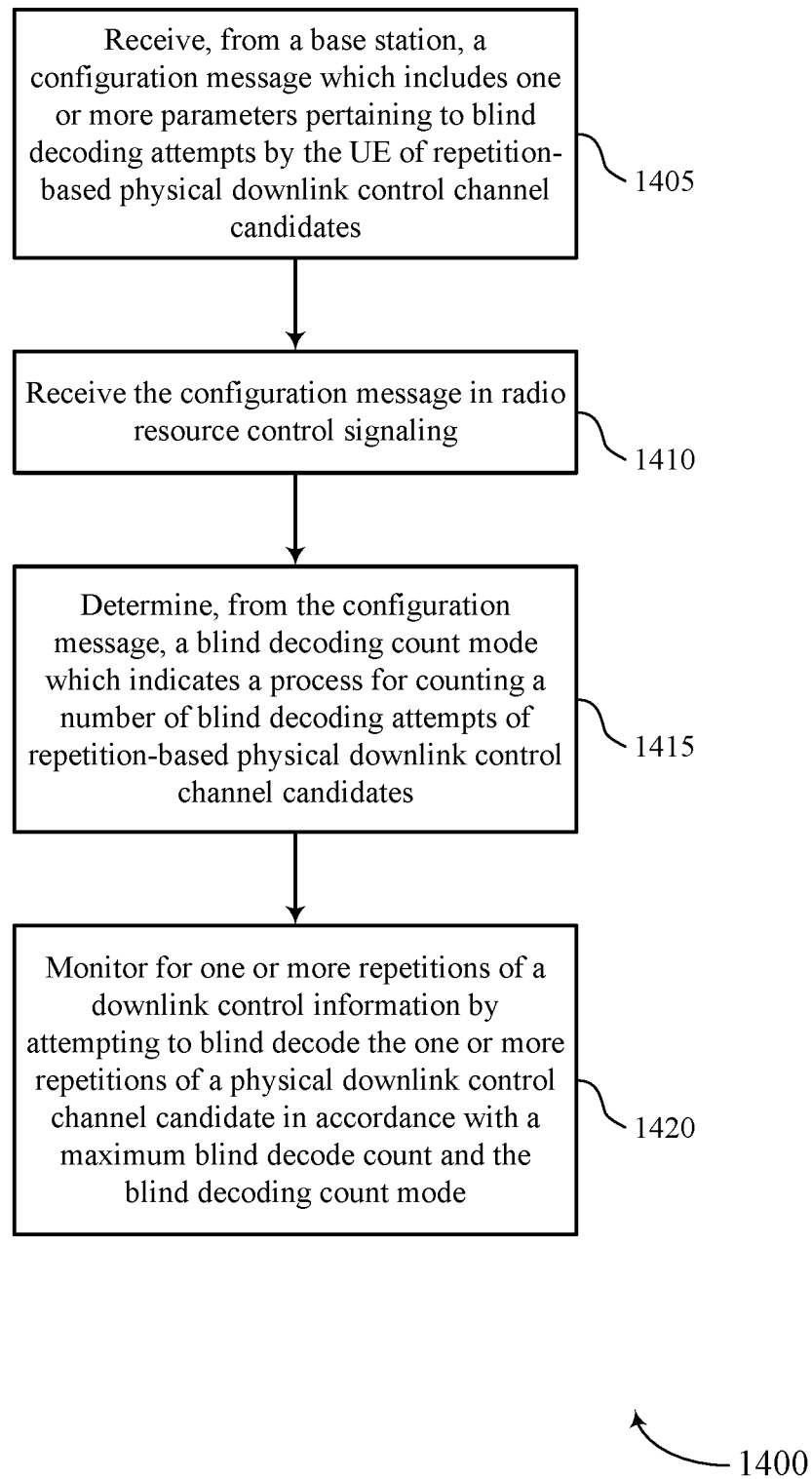

FIG. 14 shows a flowchart illustrating a method 1400 that supports blind decoding counting for repetition-based PDCCH candidates in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, a configuration message which includes one or more parameters pertaining to blind decoding attempts by the UE of repetition-based PDCCH candidates. The operations of 1405 may be performed according to the methods described herein. In some examples, aspects of the operations of 1405 may be performed by a configuration manager as described with reference to FIGS. 4 through 7.

At 1410, the UE may receive the configuration message in RRC signaling. The operations of 1410 may be performed according to the methods described herein. In some examples, aspects of the operations of 1410 may be performed by an RRC configuration manager as described with reference to FIGS. 4 through 7.

At 1415, the UE may determine, from the configuration message, a blind decoding count mode which indicates a process for counting a number of blind decoding attempts of repetition-based PDCCH candidates. The operations of 1415 may be performed according to the methods described herein. In some examples, aspects of the operations of 1415 may be performed by a BD count mode manager as described with reference to FIGS. 4 through 7.

At 1420, the UE may monitor for one or more repetitions of a DCI by attempting to blind decode the one or more repetitions of a PDCCH candidate in accordance with a maximum blind decode count and the blind decoding count mode. The operations of 1420 may be performed according to the methods described herein. In some examples, aspects of the operations of 1420 may be performed by a BD attempt manager as described with reference to FIGS. 4 through 7.

Figure 15:
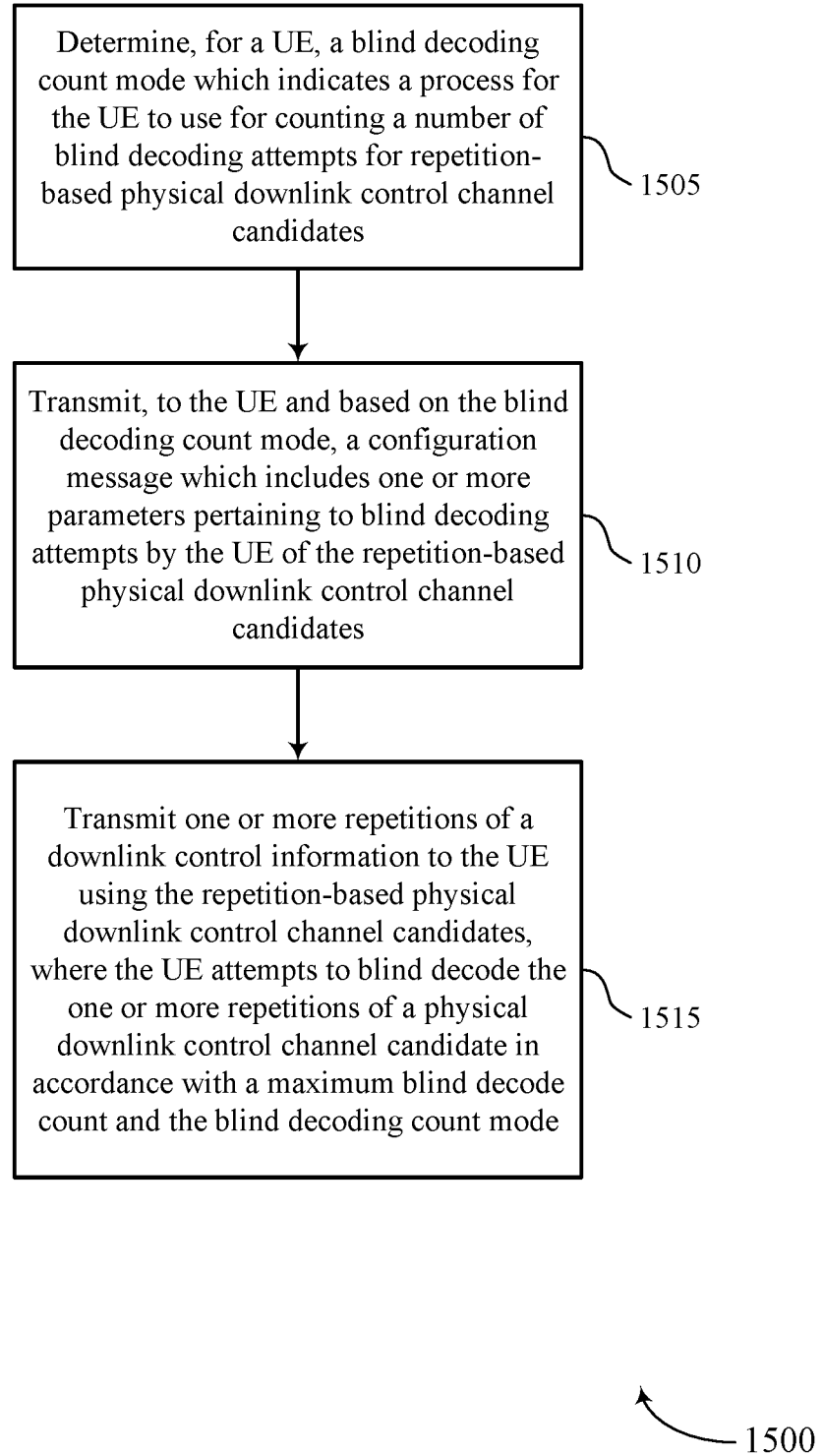

FIG. 15 shows a flowchart illustrating a method 1500 that supports blind decoding counting for repetition-based PDCCH candidates in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1505, the base station may determine, for a UE, a blind decoding count mode which indicates a process for the UE to use for counting a number of blind decoding attempts of repetition-based PDCCH candidates. The operations of 1505 may be performed according to the methods described herein. In some examples, aspects of the operations of 1505 may be performed by a BD count mode manager as described with reference to FIGS. 8 through 11.

At 1510, the base station may transmit, to the UE and based on the blind decoding count mode, a configuration message which includes one or more parameters pertaining to blind decoding attempts by the UE of the repetition-based PDCCH candidates. The operations of 1510 may be performed according to the methods described herein. In some examples, aspects of the operations of 1510 may be performed by a configuration manager as described with reference to FIGS. 8 through 11.

At 1515, the base station may transmit one or more repetitions of a DCI to the UE using the repetition-based PDCCH candidates, where the UE attempts to blind decode the one or more repetitions of a PDCCH candidate in accordance with a maximum blind decode count and the blind decoding count mode. The operations of 1515 may be performed according to the methods described herein. In some examples, aspects of the operations of 1515 may be performed by a BD attempt manager as described with reference to FIGS. 8 through 11.

The following provides an overview of aspects of the present disclosure:

Aspect 1: A method for wireless communication at a UE, comprising: receiving, from a base station, a configuration message which includes one or more parameters pertaining to blind decoding attempts by the UE of repetition-based PDCCH candidates; determining, from the configuration message, a blind decoding count mode which indicates a process for counting a number of blind decoding attempts of repetition-based PDCCH candidates; and monitoring for one or more repetitions of a DCI by attempting to blind decode the one or more repetitions of a PDCCH candidate in accordance with a maximum blind decode count and the blind decoding count mode.

Aspect 2: The method of aspect 1, further comprising: transmitting a UE capability message indicating information associated with blind decoding operations supported by the UE when performing blind decoding attempts of the repetition-based PDCCH candidates, wherein the configuration message is based at least in part on the UE capability message.

Aspect 3: The method of aspect 2, wherein the information associated with the blind decoding operations supported by the UE comprises at least one of a set of blind decoding count modes that the UE supports, a number of repetitions of the DCI associated with the blind decoding operations, or both.

Aspect 4: The method of any of aspects 1 through 3, wherein the repetition-based PDCCH candidates comprise a set of PDCCH candidates in a same search space set, the same search space set associated with a common CORESET or separate CORESETs.

Aspect 5: The method of any of aspects 1 through 4, wherein the repetition-based PDCCH candidates comprise a first PDCCH candidates in a first search space set and a second PDCCH candidate in a second search space set, the first search space set and the second search space set associated with separate CORESETs or a common CORESET.

Aspect 6: The method of any of aspects 1 through 5, wherein receiving the configuration message comprises: receiving the configuration message in RRC signaling.

Aspect 7: The method of any of aspects 1 through 6, wherein monitoring for the one or more repetitions of the DCI comprises: identifying that the blind decoding count mode comprises soft combining a first repetition of the DCI with a second repetition of the DCI; and attempting to blind decode the one or more repetitions of the PDCCH by incrementing a blind decode count by one for each soft combining, the blind decode count to not exceed the maximum blind decode count.

Aspect 8: The method of any of aspects 1 through 7, wherein monitoring for the one or more repetitions of the DCI comprises: identifying that the blind decoding count mode comprises attempting to blind decode a first repetition of the DCI and a second repetition of the DCI; and attempting to blind decode the first repetition of the PDCCH and the second repetition of the PDCCH by incrementing a blind decode count by one for each attempted blind decode, the blind decode count not to exceed the maximum blind decode count.

Aspect 9: The method of any of aspects 1 through 8, wherein monitoring for the one or more repetitions of the DCI comprises: identifying that the blind decoding count mode comprises attempting to blind decode a first repetition of the DCI and soft combining the first repetition of the DCI with a second repetition of the DCI; and attempting to blind decode the first repetition of the PDCCH and soft combining the first repetition of the PDCCH with the second repetition of the PDCCH by incrementing a blind decode count by one for each attempted blind decode and for each soft combining, the blind decode count not to exceed the maximum blind decode count.

Aspect 10: The method of any of aspects 1 through 9, wherein monitoring for the one or more repetitions of the DCI comprises: identifying that the blind decoding count mode comprises attempting to blind decode a first repetition of the PDCCH and a second repetition of the PDCCH and soft combining the first repetition of the DCI with the second repetition of the DCI; and attempting to blind decode the first repetition of the PDCCH and the second repetition of the PDCCH and soft combining the first repetition of the PDCCH and the second repetition of the PDCCH by incrementing a blind decode count by one for each attempted blind decode and for each soft combining, the blind decode count not to exceed the maximum blind decode count.

Aspect 11: The method of any of aspects 1 through 10, wherein the repetition-based PDCCH candidates comprise a first PDCCH candidate in a first search space set and a second PDCCH in a second search space.

Aspect 12: The method of any of aspects 1 through 11, further comprising: transmitting, to a base station, an indication of a number to be counted in the blind decode count for each blind decoding attempt of the one or more repetitions of the DCI, the blind decoding count mode based at least in part on the indication.

Aspect 13: A method for wireless communication at a base station, comprising: determining, for a UE, a blind decoding count mode which indicates a process for the UE to use for counting a number of blind decoding attempts of repetition-based PDCCH candidates; transmitting, to the UE and based at least in part on the blind decoding count mode, a configuration message which includes one or more parameters pertaining to blind decoding attempts by the UE of the repetition-based PDCCH candidates; and transmitting one or more repetitions of a DCI to the UE using the repetition-based PDCCH candidates, wherein the UE attempts to blind decode the one or more repetitions of a PDCCH candidate in accordance with a maximum blind decode count and the blind decoding count mode.

Aspect 14: The method of aspect 13, further comprising: receiving a UE capability message from the UE indicating information associated with blind decoding operations that the UE supports when performing blind decoding attempts of the repetition-based PDCCH candidates, wherein the configuration message is based at least in part on the UE capability message.

Aspect 15: The method of aspect 14, wherein the information associated with the blind decoding operations that the UE supports comprises at least one of a set of blind decoding count modes that the UE supports, a number of repetitions of the DCI associated with the blind decoding operations, or both.

Aspect 16: The method of any of aspects 13 through 15, wherein the repetition-based PDCCH candidates comprise a set of PDCCH candidates in a same search space set, the same search space set associated with a common CORESET or separate CORESETs.

Aspect 17: The method of any of aspects 13 through 16, wherein the repetition-based PDCCH candidates comprise a first PDCCH candidate in a first search space set and a second PDCCH candidate in a second search space set, the first search space set and the first search space set associated with separate CORESETs or a common CORESET.

Aspect 18: The method of any of aspects 13 through 17, wherein the configuration message is transmitted in RRC signaling.

Aspect 19: An apparatus for wireless communication, comprising a processor of a UE; a transceiver coupled with the processor; and memory coupled with the processor, the memory and the processor configured to cause the apparatus to perform a method of any of aspects 1 through 12.

Aspect 20: An apparatus for wireless communication at a UE, comprising at least one means for performing a method of any of aspects 1 through 12.

Aspect 21: A non-transitory computer-readable medium storing code for wireless communication at a UE, the code comprising instructions executable by a processor to perform a method of any of aspects 1 through 12.

Aspect 22: An apparatus for wireless communication at a base station, comprising a processor of a base station; a transceiver coupled with the processor; and memory coupled with the processor, the memory and the processor configured to cause the apparatus to perform a method of any of aspects 13 through 18.

Aspect 23: An apparatus for wireless communication at a base station, comprising at least one means for performing a method of any of aspects 13 through 18.

Aspect 24: A non-transitory computer-readable medium storing code for wireless communication at a base station, the code comprising instructions executable by a processor to perform a method of any of aspects 13 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting UE capability information that indicates UE support for blind decoding of repetition-based physical downlink control channel candidates, wherein the UE capability information is indicative of a blind decoding count mode which indicates a quantity by which a blind decode count is incremented for each blind decoding attempt of repetition-based physical downlink control channel candidates, the quantity selected between a first quantity of repetitions of a physical downlink control channel candidate and a second quantity that is greater than the first quantity; and
    monitoring for one or more repetitions of a downlink control information by attempting to blind decode one or more repetitions of the physical downlink control channel candidate in accordance with a maximum blind decode count and the blind decoding count mode.

2. The method of claim 1, wherein the UE capability information indicates a quantity of repetitions of the downlink control information associated with the blind decoding of repetition-based physical downlink control channel candidates.

3. The method of claim 1, wherein the repetition-based physical downlink control channel candidates comprise a set of physical downlink control channel candidates in a same search space set, the same search space set associated with a common control resource set or separate control resource sets.

4. The method of claim 1, wherein the repetition-based physical downlink control channel candidates comprise a first physical downlink control channel candidate in a first search space set and a second physical downlink control channel candidate in a second search space set, the first search space set and the second search space set associated with separate control resource sets or a common control resource set.

5. The method of claim 1, further comprising:
receiving a configuration message in radio resource control signaling, the configuration message including one or more parameters pertaining to the blind decoding of repetition-based physical downlink control channel candidates by the UE.

6. The method of claim 1, wherein monitoring for the one or more repetitions of the downlink control information comprises:
identifying that the blind decoding count mode comprises soft combining a first repetition of the downlink control information with a second repetition of the downlink control information; and
attempting to blind decode the one or more repetitions of the physical downlink control channel candidate, the quantity being based at least in part on the soft combining, the blind decode count to not exceed the maximum blind decode count.

7. The method of claim 1, wherein monitoring for the one or more repetitions of the downlink control information comprises:
identifying that the blind decoding count mode comprises attempting to blind decode a first repetition of the downlink control information and a second repetition of the downlink control information; and
attempting to blind decode the first repetition of the physical downlink control channel candidate and the second repetition of the physical downlink control channel candidate, the quantity being the first quantity, the blind decode count not to exceed the maximum blind decode count.

8. The method of claim 1, wherein monitoring for the one or more repetitions of the downlink control information comprises:
identifying that the blind decoding count mode comprises attempting to blind decode a first repetition of the downlink control information and soft combining the first repetition of the downlink control information with a second repetition of the downlink control information; and
attempting to blind decode the first repetition of the physical downlink control channel candidate and soft combining the first repetition of the physical downlink control channel candidate with the second repetition of the physical downlink control channel candidate, the quantity being based at least in part on the attempted blind decode and the soft combining, the blind decode count not to exceed the maximum blind decode count.

9. The method of claim 1, wherein monitoring for the one or more repetitions of the downlink control information comprises:
identifying that the blind decoding count mode comprises attempting to blind decode a first repetition of the physical downlink control channel candidate and a second repetition of the physical downlink control channel candidate and soft combining the first repetition of the downlink control information with the second repetition of the downlink control information; and
attempting to blind decode the first repetition of the physical downlink control channel candidate and the second repetition of the physical downlink control channel candidate and soft combining the first repetition of the physical downlink control channel candidate and the second repetition of the physical downlink control channel candidate, the quantity being based at least in part on the attempted blind decode and the soft combining, the blind decode count not to exceed the maximum blind decode count.

10. The method of claim 1, further comprising:
transmitting, to a base station, an indication of the quantity by which the blind decode count is incremented for each blind decoding attempt of the one or more repetitions of the downlink control information, the blind decoding count mode based at least in part on the indication.

11. An apparatus for wireless communication, comprising:
a processor of a user equipment (UE);
a transceiver coupled with the processor; and
memory coupled with the processor, the memory and the processor configured to cause the apparatus to:
transmit UE capability information that indicates UE support for blind decoding of repetition-based physical downlink control channel candidates, wherein the UE capability information is indicative of a blind decoding count mode which indicates a quantity by which a blind decode count is incremented for each blind decoding attempt of repetition-based physical downlink control channel candidates, the quantity selected between a first quantity of repetitions of a physical downlink control channel candidate and a second quantity that is greater than the first quantity; and
monitor for one or more repetitions of a downlink control information by attempting to blind decode one or more repetitions of the physical downlink control channel candidate in accordance with a maximum blind decode count and the blind decoding count mode.

12. The apparatus of claim 11, wherein the UE capability information indicates a quantity of repetitions of the downlink control information associated with the blind decoding of repetition-based physical downlink control channel candidates.

13. The apparatus of claim 11, wherein the repetition-based physical downlink control channel candidates comprise a set of physical downlink control channel candidates in a same search space set, the same search space set associated with a common control resource set or separate control resource sets.

14. The apparatus of claim 11, wherein the repetition-based physical downlink control channel candidates comprise a first physical downlink control channel candidate in a first search space set and a second physical downlink control channel candidate in a second search space set, the first search space set and the second search space set associated with separate control resource sets or a common control resource set.

15. The apparatus of claim 11, wherein the memory and the processor are further configured to cause the apparatus to:
receive a configuration message in radio resource control signaling, the configuration message including one or more parameters pertaining to the blind decoding of repetition-based physical downlink control channel candidates by the UE.

16. The apparatus of claim 11, wherein, to monitor for the one or more repetitions of the downlink control information, the memory and the processor are further configured to cause the apparatus to:
identify that the blind decoding count mode comprises soft combining a first repetition of the downlink control information with a second repetition of the downlink control information; and
attempt to blind decode the one or more repetitions of the physical downlink control channel candidate, the quantity being based at least in part on the soft combining, the blind decode count to not exceed the maximum blind decode count.

17. The apparatus of claim 11, wherein, to monitor for the one or more repetitions of the downlink control information, the memory and the processor are further configured to cause the apparatus to:
identify that the blind decoding count mode comprises attempting to blind decode a first repetition of the downlink control information and a second repetition of the downlink control information; and
attempt to blind decode the first repetition of the physical downlink control channel candidate and the second repetition of the physical downlink control channel candidate, the quantity being the first quantity, the blind decode count not to exceed the maximum blind decode count.

18. The apparatus of claim 11, wherein, to monitor for the one or more repetitions of the downlink control information, the memory and the processor are further configured to cause the apparatus to:
identify that the blind decoding count mode comprises attempting to blind decode a first repetition of the downlink control information and soft combining the first repetition of the downlink control information with a second repetition of the downlink control information; and
attempt to blind decode the first repetition of the physical downlink control channel candidate and soft combining the first repetition of the physical downlink control channel candidate with the second repetition of the physical downlink control channel candidate, the quantity being based at least in part on the attempted blind decode and the soft combining, the blind decode count not to exceed the maximum blind decode count.

19. The apparatus of claim 11, wherein, to monitor for the one or more repetitions of the downlink control information, the memory and the processor are further configured to cause the apparatus to:
identify that the blind decoding count mode comprises attempting to blind decode a first repetition of the physical downlink control channel candidate and a second repetition of the physical downlink control channel candidate and soft combining the first repetition of the downlink control information with the second repetition of the downlink control information; and
attempt to blind decode the first repetition of the physical downlink control channel candidate and the second repetition of the physical downlink control channel candidate and soft combining the first repetition of the physical downlink control channel candidate and the second repetition of the physical downlink control channel candidate, the quantity being based at least in part on the attempted blind decode and the soft combining, the blind decode count not to exceed the maximum blind decode count.

20. The apparatus of claim 11, wherein the memory and the processor are further configured to cause the apparatus to:
transmit, to a base station, an indication of the quantity by which the blind decode count is incremented for each blind decoding attempt of the one or more repetitions of the downlink control information, the blind decoding count mode based at least in part on the indication.

21. An apparatus for wireless communication at a user equipment (UE), comprising:
means for transmitting UE capability information that indicates UE support for blind decoding of repetition-based physical downlink control channel candidates, wherein the UE capability information is indicative of a blind decoding count mode which indicates a quantity by which a blind decode count is incremented for each blind decoding attempt of repetition-based physical downlink control channel candidates, the quantity selected between a first quantity of repetitions of a physical downlink control channel candidate and a second quantity that is greater than the first quantity; and
means for monitoring for one or more repetitions of a downlink control information by attempting to blind decode one or more repetitions of the physical downlink control channel candidate in accordance with a maximum blind decode count and the blind decoding count mode.

22. The apparatus of claim 21, wherein the UE capability information indicates a quantity of repetitions of the downlink control information associated with the blind decoding of repetition-based physical downlink control channel candidates.

23. The apparatus of claim 21, wherein:
the repetition-based physical downlink control channel candidates comprise a set of physical downlink control channel candidates in a same search space set, the same search space set associated with a common control resource set or separate control resource sets.

24. The apparatus of claim 21, wherein:
the repetition-based physical downlink control channel candidates comprise a first physical downlink control channel candidate in a first search space set and a second physical downlink control channel candidate in a second search space set, the first search space set and the second search space set associated with separate control resource sets or a common control resource set.

25. The apparatus of claim 21, further comprising:
means for receiving a configuration message in radio resource control signaling, the configuration message including one or more parameters pertaining to the blind decoding of repetition-based physical downlink control channel candidates by the UE.

26. A non-transitory computer-readable medium storing code for wireless communication at a user equipment (UE), the code comprising instructions executable by a processor to:

transmitting UE capability information that indicates UE support for blind decoding of repetition-based physical downlink control channel candidates, wherein the UE capability information is indicative of a blind decoding count mode which indicates a quantity by which a blind decode count is incremented for each blind decoding attempt of repetition-based physical downlink control channel candidates, the quantity selected between a first quantity of repetitions of a physical downlink control channel candidate and a second quantity that is greater than the first quantity; and monitoring for one or more repetitions of a downlink control information by attempting to blind decode one or more repetitions of the physical downlink control channel candidate in accordance with a maximum blind decode count and the blind decoding count mode.

* * * * *